United States Patent
Drayna

(10) Patent No.: US 11,797,089 B2
(45) Date of Patent: Oct. 24, 2023

(54) SYSTEMS AND METHODS FOR SIDEWALK DETECTION FOR PERSONAL MOBILITY VEHICLES

(71) Applicant: Lyft, Inc., San Francisco, CA (US)

(72) Inventor: Garrett Korda Drayna, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 839 days.

(21) Appl. No.: 16/588,408

(22) Filed: Sep. 30, 2019

(65) Prior Publication Data
US 2021/0034156 A1 Feb. 4, 2021

Related U.S. Application Data

(60) Provisional application No. 62/880,057, filed on Jul. 29, 2019.

(51) Int. Cl.
| | | |
|---|---|---|
| G06F 3/01 | (2006.01) | |
| G08B 6/00 | (2006.01) | |
| B62K 5/025 | (2013.01) | |
| B62K 5/007 | (2013.01) | |

(52) U.S. Cl.
CPC .............. *G06F 3/016* (2013.01); *B62K 5/007* (2013.01); *B62K 5/025* (2013.01); *G06F 3/017* (2013.01); *G08B 6/00* (2013.01); *A61G 2203/14* (2013.01)

(58) Field of Classification Search
CPC ......... G06F 3/016; G06F 3/017; B62K 5/007; B62K 5/025; B62K 3/002; G08B 6/00; A61G 2203/14; B62J 45/20; B62J 50/22; B62J 45/41
See application file for complete search history.

(56) References Cited

U.S. PATENT DOCUMENTS

| | | | | | |
|---|---|---|---|---|---|
| 6,014,595 | A | * | 1/2000 | Kobayashi | .............. E01F 9/529 701/484 |
| 2011/0144907 | A1 | * | 6/2011 | Ishikawa | ................ G01C 21/30 701/532 |
| 2014/0355879 | A1 | * | 12/2014 | Agosta | ...................... G06T 7/11 382/199 |

(Continued)

OTHER PUBLICATIONS

Wikipedia, "Welch's method", URL: https://en.wikipedia.org/wiki/Welch%27s_method, Mar. 26, 2005, 2 pages.

(Continued)

*Primary Examiner* — Quan Zhen Wang
*Assistant Examiner* — Mancil Littlejohn, Jr.
(74) *Attorney, Agent, or Firm* — Baker Botts L.L.P.

(57) ABSTRACT

The disclosed system may include a non-transitory memory and one or more hardware processors configured to execute instructions from the non-transitory memory to perform operations including (1) determining one or more vibration signals detected by a personal mobility vehicle, (2) determining that the one or more vibration signals correspond to a particular type of pathway for the personal mobility vehicle, (3) generating a feedback signal corresponding to the particular type of pathway, and (4) transmitting the feedback signal corresponding to the particular type of pathway. Various other methods, systems, and computer-readable media are also disclosed.

20 Claims, 20 Drawing Sheets

(56) References Cited

U.S. PATENT DOCUMENTS

| | | | |
|---|---|---|---|
| 2014/0370870 A1* | 12/2014 | Mankowski | H04W 4/48 |
| | | | 455/418 |
| 2016/0221581 A1* | 8/2016 | Talwar | B60W 30/00 |
| 2019/0236859 A1* | 8/2019 | Bradley | G07C 5/10 |
| 2019/0250618 A1* | 8/2019 | Batts | G05D 1/0274 |
| 2020/0124430 A1* | 4/2020 | Bradlow | G06Q 30/0207 |
| 2020/0143237 A1* | 5/2020 | Gordon | G06N 3/08 |

OTHER PUBLICATIONS

Wikipedia, "Spectral density", URL: https://en.wikipedia.org/wiki/Spectral_density, Jan. 27, 2004, 7 pages.

Wikipedia, "Decision tree", URL: https://en.wikipedia.org/wiki/Decision_tree, Mar. 26, 2004, 5 pages.

Wikipedia, "Random forest", URL: https://en.wikipedia.org/wiki/Random_forest, Jan. 30, 2005, 8 pages.

Fumo, David, "Types of Machine Learning Algorithms You Should Know", URL: https://towardsdatascience.com/types-of-machine-learning-algorithms-you-should-know-953a08248861, Towards Data Science, Jun. 15, 2017, 8 pages.

* cited by examiner

1100

| | FEATURE | IMPORTANCE |
|---|---|---|
| 0 | PSD at 10Hz | 0.105630 |
| 1 | Speed | 0.103382 |
| 2 | PSD at 4Hz | 0.092945 |
| 3 | PSD at 5Hz | 0.090453 |
| 4 | PSD at 8Hz | 0.090301 |
| 5 | PSD at 14Hz | 0.078885 |
| 6 | PSD at 9Hz | 0.066022 |
| 7 | Acceleration | 0.062152 |
| 8 | PSD at 15Hz | 0.048784 |
| 9 | PSD at 3Hz | 0.042985 |
| 10 | PSD at 12Hz | 0.035181 |
| 11 | PSD at 16Hz | 0.034285 |
| 12 | PSD at 11Hz | 0.031976 |
| 13 | PSD at 6Hz | 0.027800 |
| 14 | PSD at 7Hz | 0.023871 |
| 15 | PSD at 1Hz | 0.023382 |
| 16 | PSD at 13Hz | 0.019538 |
| 17 | PSD at 0Hz | 0.011996 |
| 18 | PST at 2Hz | 0.010433 |

*FIG. 11*

SYSTEMS AND METHODS FOR SIDEWALK DETECTION FOR PERSONAL MOBILITY VEHICLES

BACKGROUND

Some transportation services may provide personal mobility vehicles (such as motorized scooters, electric scooters, bicycles, and the like) for users to rent for temporary transportation. In general, these types of vehicles may be designed and/or intended to be driven on roads (instead of sidewalks). For example, electric or motorized vehicles may be a hinderance or even dangerous to pedestrians and others using sidewalks. Thus, some cities may issue penalties (such as fines or citations) to people that drive personal mobility vehicles on sidewalks. A transportation service may wish to reduce the frequency of its users incurring these penalties, as well as increase the overall safety of both its users and pedestrians. Accordingly, the transportation service may wish to detect when a user is driving a personal mobility vehicle on a sidewalk. Efficient and accurate sidewalk-detection for personal mobility vehicles may provide a better experience to transportation requestors, transportation services, and the general public.

BRIEF DESCRIPTION OF THE DRAWINGS

The accompanying drawings illustrate a number of example embodiments and are a part of the specification. Together with the following description, the drawings demonstrate and explain various principles of the instant disclosure.

FIG. 11 is an illustration of an example portion of a random forest model.

Figure 1:
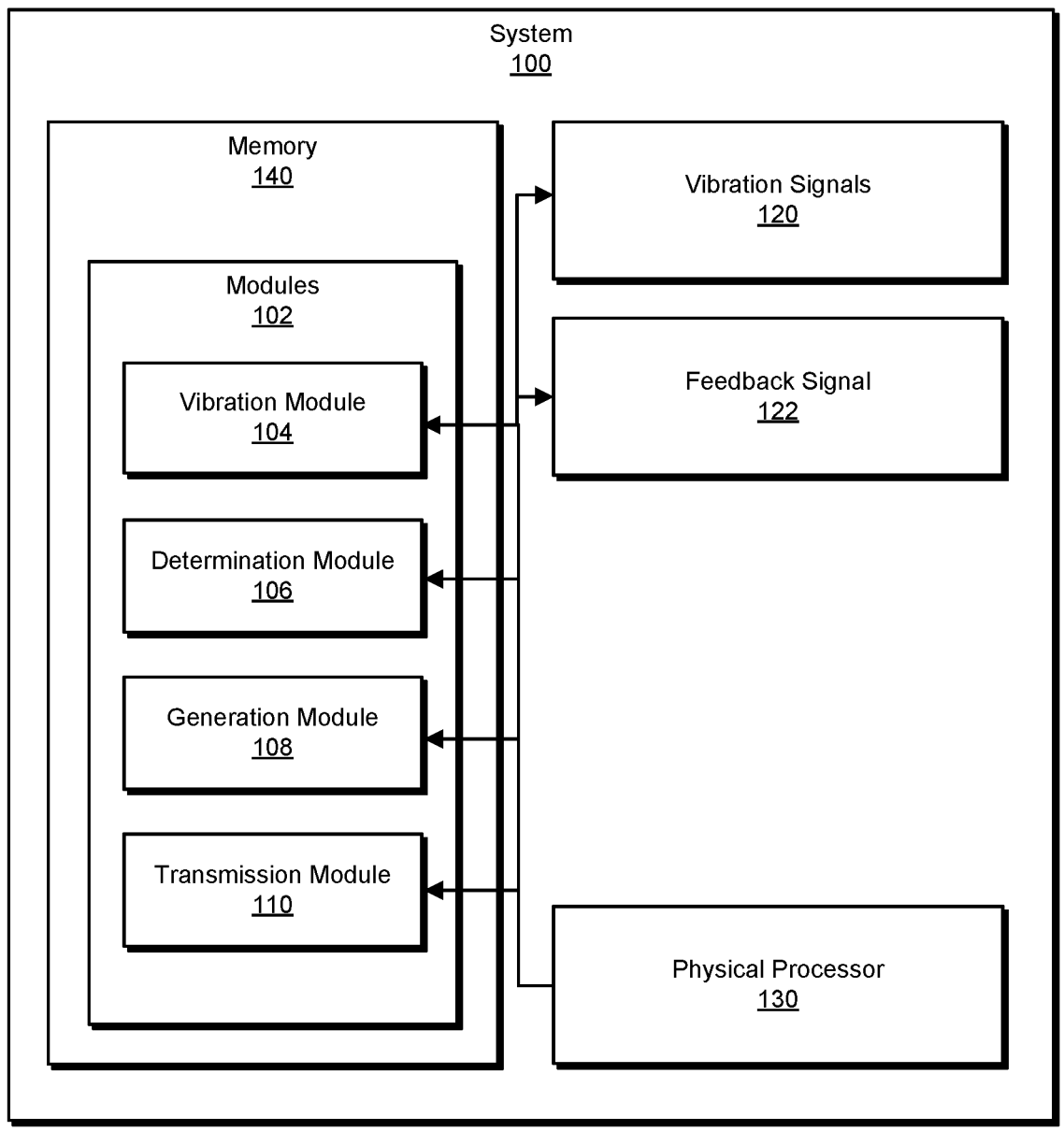
FIG. 1 is a block diagram of an example system for sidewalk-detection for personal mobility vehicles.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to detecting when a personal mobility vehicle (such as a motorized scooter) is moving or driving on a sidewalk. Some transportation services (e.g., ride-sharing services) may provide personal mobility vehicles for users to rent or access in order to transport themselves to a particular destination. These transportation services may wish that the users generally operate the personal mobility vehicles on a road (e.g., as a car) instead of on sidewalks or other surfaces not intended for use by motorized vehicles. For example, a transportation service may wish to reduce the frequency with which its users violate laws or regulations that prohibit driving motorized scooters on sidewalks, as well as to avoid safety hazards for pedestrians and others using sidewalks.

Accordingly, as may be appreciated, the systems and methods described herein may detect when a personal mobility vehicle is operating on a sidewalk. Specifically, these systems and methods may analyze vibrations introduced into the personal mobility vehicle while the vehicle is moving. A machine learning algorithm may determine whether the vibrations within the vehicle include particular vibrations (e.g., vibrations with a certain frequency or pattern) corresponding to sidewalks. In some cases, these particular vibrations may be caused when the front and/or back wheel of the vehicle moves over sidewalk seams (e.g., gaps between two sections of the sidewalk). The machine learning algorithm may detect that the vehicle is moving on the sidewalk based on one or more additional factors, such as the speed and/or vertical acceleration of the vehicle. In some embodiments, the disclosed systems and methods may perform this detection in real-time (e.g., within seconds after the user has moved the personal mobility vehicle to the sidewalk). Additionally, the disclosed systems and methods may perform a variety of corrective actions in response to detecting that a personal mobility vehicle is driving on a sidewalk. For example, these systems and methods may direct a user to move their vehicle to a road as soon as possible. In other examples, these systems and methods may reduce the functionality of the vehicle (e.g., by restricting the maximum speed of the vehicle). Furthermore, the disclosed systems and methods may incorporate the geographic location of detected sidewalks into maps provided to users of personal mobility vehicles.

The disclosed systems and methods may provide several advantages to transportation management and/or the field of transportation. For example, these systems and methods may improve the safety of both users driving personal mobility vehicles and pedestrians using sidewalks in the vicinity of the personal mobility vehicles. In addition, these systems and methods may improve the functioning of a computer that implements a machine learning algorithm trained for sidewalk-detection. For example, the machine learning algorithm may enable the computer to more accurately and efficiently detect when a personal mobility vehicle is moving on a sidewalk.

FIG. 1 is a block diagram of an exemplary system 100 for sidewalk detection. As illustrated in this figure, exemplary system 100 may include one or more modules 102 for performing one or more tasks. As will be explained in greater detail below, modules 102 may include a vibration module 104, a determination module 106, a generation module 108, and a transmission module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). In addition, one or more of modules 102 may perform any of the functionality described herein in connection with any of the devices illustrated in FIG. 2. One or more of modules 102 in FIG. 2 may also represent all or portions of one or more special-purpose computers configured to perform one or more tasks.

Figure 2:
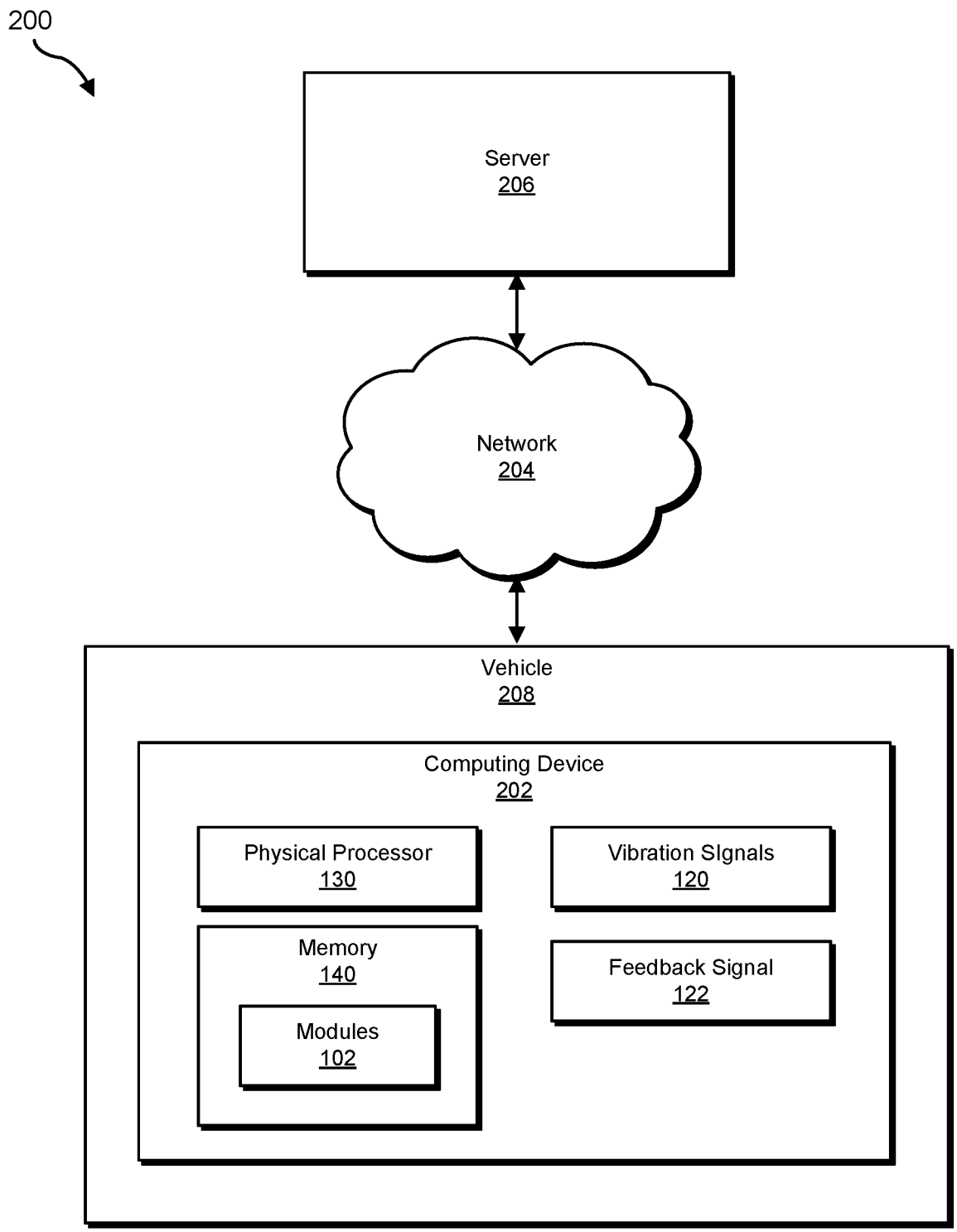
FIG. 2 is a block diagram of an example system for sidewalk-detection for personal mobility vehicles.

As illustrated in FIG. 2, system 200 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate sidewalk detection. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may also include vibration signals 120. In some examples, vibration signals 120 may include or represent a portion or collection of data describing the strength, magnitude, frequency, and/or pattern of one or more vibrations detected within a personal mobility vehicle. The term "vibration," as used herein, generally refers to any type or form of mechanical oscillation. In some examples, vibrations may be introduced into at least one component (e.g., the wheels, chassis, motor, etc.) of a personal mobility vehicle while the vehicle is operating (e.g., driving or moving). One or more of these vibrations may be generated or caused by physical features of the surface on which the vehicle is operating. In some embodiments, vibration signals 120 may also include one or more additional types of signals corresponding to the operation of the personal mobility vehicle. For example, vibration signals 120 may include information about the velocity of the vehicle and/or the vertical (e.g., x-axis) acceleration or deceleration of the vehicle. As will be explained in greater detail below, the disclosed systems may classify or identify the type of surface on which the vehicle is operating based at least in part on vibration signals 120.

As illustrated in FIG. 1, system 100 may also include a feedback signal 122. Feedback signal 122 generally represents any type or form of message, data, and/or reaction generated in response to detecting the type of the surface on which a personal mobility vehicle is operating. Feedback signal 122 may include graphics, an audio signal, haptic feedback, and/or computer-executable instructions. Specific examples of feedback signal 122 include, without limitation, an audiovisual display that directs a user to move a personal mobility vehicle to a different type of surface, a message indicating that the user was operating the personal mobility vehicle on a sidewalk, and/or instructions that direct the personal mobility vehicle to switch operational modes (e.g., switch to a mode with a reduced maximum velocity).

Example system 200 in FIG. 2 may be implemented in a variety of ways. For example, all or a portion of example system 200 may represent portions of example system 100 in FIG. 1. As shown in FIG. 2, system 200 may include a vehicle 208 and/or a computing device 202 in communication with a server 206 via a network 204. In one example, all or a portion of the functionality of modules 102 may be performed by computing device 202, server 206, vehicle 208, and/or any other suitable computing system. As will be described in greater detail below, one or more of modules 102 from FIG. 2 may, when executed by at least one processor of computing device 202 and/or server 206, enable computing device 202 and/or server 206 to detect when a personal mobility vehicle is operating on a sidewalk.

Vehicle 208 generally represents any type or form of personal mobility vehicle. The term "personal mobility vehicle," as used herein, generally refers to a transportation device designed to transport a single person or a small number of people. Examples of vehicle 208 include, without limitation, motorized or electric scooters, manual scooters, motorized or electric bicycles, manual bicycles, motorcycles, cars, trucks, automobiles, golf carts, and the like.

Computing device 202 generally represents any type or form of computing device capable of executing computer-readable instructions. In some examples, computing device 202 may detect, record, and/or analyze vibration signals 120. Examples of computing device 202 include, without limitation, Internet of things (IoT) devices, microprocessors, microcontrollers, CPUs, FPGAs that implement softcore processors, ASICs, mobile devices, servers, portions of one or more of the same, variations or combinations of one or more of the same, and/or any other suitable computing device.

As shown in FIG. 2, computing device 202 may be part of and/or in communication with vehicle 208. In some embodiments, computing device 202 may be integrated into vehicle 208. For example, computing device 202 may be part of the hardware, firmware, and/or software of vehicle 208. In other embodiments, computing device 202 may represent all or a portion of a mobile device of a user that is operating vehicle 208. In these embodiments, computing device 202 may run an application that manages transportation services for the user.

Server 206 generally represents any type or form of computing device that stores, analyzes, and/or processes data. In some examples, server 206 may store, analyze, and/or process vibration signals 120. In one embodiment, server 206 may be integrated into a personal mobility vehicle (such as vehicle 208). In other embodiments, server 206 may communicate remotely with one or more personal mobility vehicles or computing devices. Examples of server 206 include, without limitation, database servers, application servers, physical servers, virtual servers, variations or combinations of one or more of the same, and/or any other suitable computing device.

Network 204 generally represents any medium or architecture capable of facilitating communication or data transfer. In one example, network 204 may facilitate communication between computing device 202 and server 206. Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource RSVP-TE network, portions of one or more of the same, variations or combinations of one or more of the same, and/or any other suitable network. Although illustrated as being external to network 204 in FIG. 2, computing device 202 and server 206 may each represent a portion of network 204 and/or be included in network 204.

Figure 3:
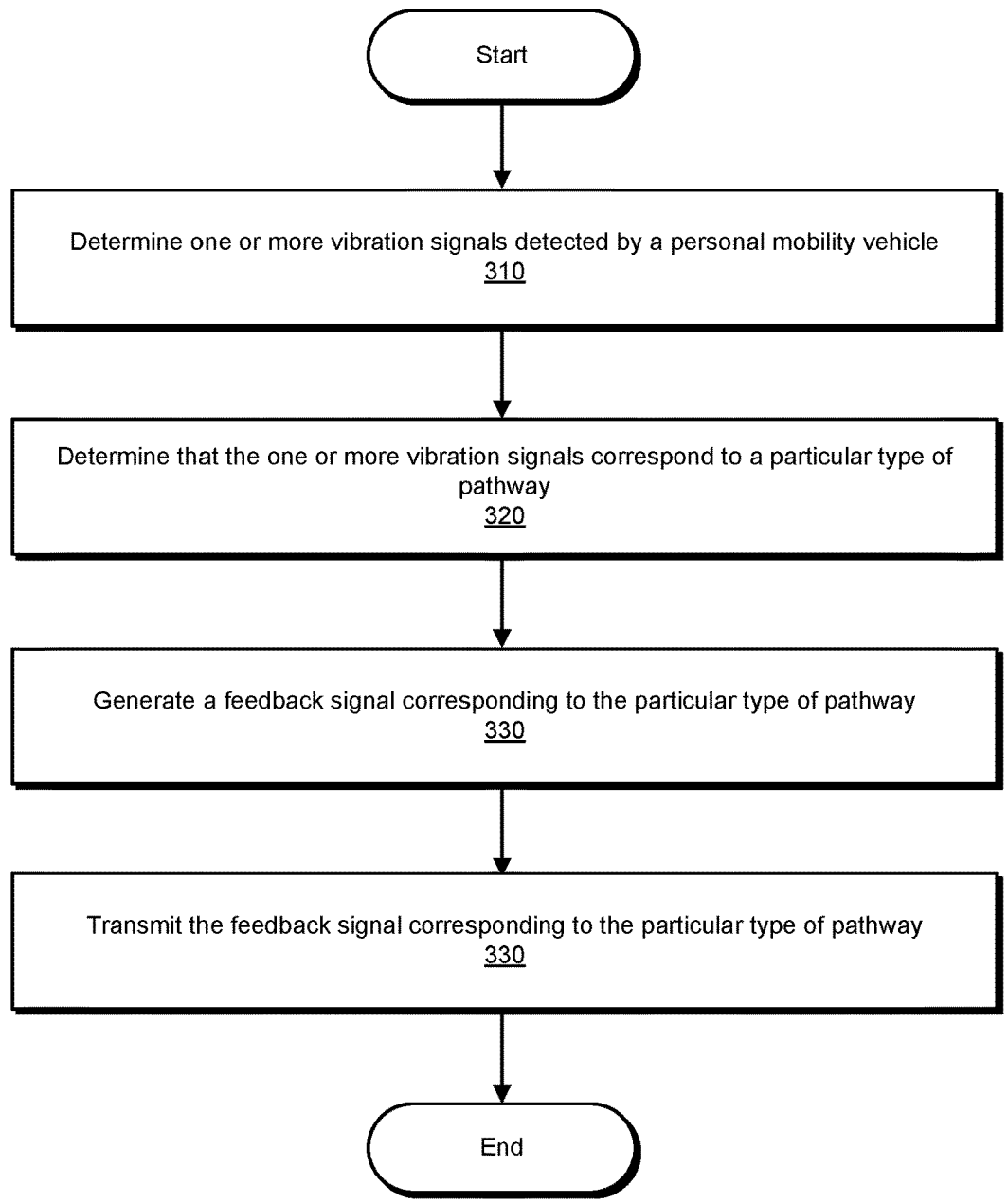
FIG. 3 is a flow diagram of an example method for sidewalk-detection for personal mobility vehicles.

FIG. 3 is a flow diagram of an example computer-implemented method 300 for sidewalk detection. The steps shown in FIG. 3 may be performed by any suitable computer-executable code and/or computing system, including system 100 in FIG. 1 and/or system 200 in FIG. 2. In one example, each of the steps shown in FIG. 3 may represent an algorithm whose structure includes and/or is represented by multiple sub-steps, examples of which will be provided in greater detail below.

At step 310, one or more of the systems described herein may determine one or more vibration signals detected by a personal mobility vehicle. For example, vibration module 104 may, as part of computing device 202 in FIG. 2, determine vibration signals 120.

The systems described herein may perform step 310 in a variety of ways and/or contexts. In some examples, vibration module 104 may record information about vibrations detected by and/or introduced into vehicle 208 while vehicle 208 is operating (e.g., moving or driving) on a pathway. The term "pathway," as used herein, generally refers to any type or form of ground surface on which a personal mobility vehicle may drive or move. Examples of pathways include, without limitation, roads, streets, sidewalks, alleys, trails, bike lanes, highways, and the like. Some types of pathways (such as roads and streets) may be suitable for use by personal mobility vehicles. Other types of pathways (such as sidewalks) may be unsuitable for use by personal mobility vehicles or other types of motorized vehicles. Accordingly, the disclosed systems may determine the type of pathway on which a personal mobility vehicle is operating and/or detect when the personal mobility vehicle switches to an unsuitable pathway.

Vibration module 104 may record information about vibrations detected by and/or introduced into vehicle 208 at various points while vehicle 208 is operating on a pathway. In some examples, vibration module 104 may determine that a user has begun driving vehicle 208 along a route from a starting location to a destination. This route may include one or more types of pathways. In one embodiment, vibration module 104 may determine that the user has turned on vehicle 208, begun driving vehicle 208, and/or requested to utilize vehicle 208 for temporary transportation to the destination (e.g., as part of a ride-sharing service or transportation service). Vibration module 104 may record information about vibrations introduced into vehicle 208 while vehicle 208 moves along all or a portion of the route. For example, vibration module 104 may sample the vibrations within vehicle 208 at certain points in time and/or with a certain frequency (e.g., at 75 hertz, 100 hertz, 200 hertz, etc.) while the user is driving vehicle 208 along the route.

Vibration module 104 may record various types of information about the vibrations introduced into vehicle 208. In particular, vibration module 104 may record the frequency of the vibrations and/or the magnitude (e.g., strength) of the vibrations. In one embodiment, vibration module 104 may record information about the magnitude of vibrations within vehicle 208 across a certain frequency range (e.g., 0-15 hertz, 0-50 hertz, etc.). In some examples, vibration module 104 may record raw data about the magnitude of vibrations with certain frequencies. Additionally or alternatively, vibration module 104 may process this data, such as by computing the power spectrum of the data. In one embodiment, collection module 104 may compute a power spectrum by performing a Fast Fourier Transform (FFT) or similar algorithm. Additionally or alternatively, vibration module 104 may compute a power spectrum using Welch's method for spectral density estimation. In some embodiments, Welch's method (and related methods, such as Bartlett's method) may produce power spectrums with significantly higher (e.g., 3-5 times higher) signal-to-noise ratios than FFTs. Thus, using Welch's method may enable more accurate sidewalk-detection. In addition, performing a power spectrum analysis of data describing the vibrations within a personal mobility vehicle may compress the data, thereby enabling more efficient analysis of the data (e.g., by reducing the time and/or bandwidth involved in sending the data to a backend server for analysis).

In some examples, vibration module 104 may record additional types of information about vehicle 208 while vehicle 208 moves along a route. For example, vibration module 104 may record information about the speed and/or acceleration of vehicle 208. In one embodiment, vibration module 104 may collect information about the vertical (e.g., x-axis) acceleration or deceleration of vehicle 208. This information may at least partially indicate when vehicle 208 is moving over a bump, crack, or other feature of a pathway. Furthermore, vibration module 104 may collect information about the geographic location of vehicle 208 as vehicle 208 moves along the route. This information may be used to identify the location of various types of pathways along the route. Vibration module 104 may collect or not collect data based on user preferences (e.g., a user may indicate whether or not vibration module 104 may collect location data and/or sensor data collected by vehicle 208). In addition, collected data may be deleted once it is used (e.g., to train a model to identify sidewalks, to map the locations of sidewalks, and/or to determine whether a vehicle is currently operating on a sidewalk) and/or on a periodic basis (e.g., hourly or daily).

Vibration module 104 may determine vibration information and/or any additional information using a variety of sensors, devices, and/or tools. In some examples, vibration module 104 may include and/or be connected to instruments such as an accelerometer, a gyroscope, a magnetometer, a Global Positioning System (GPS) and/or an Inertial Measurement Unit (IMU). In one embodiment, one or more of these instruments may be physically incorporated into vehicle 208. These instruments may be located on any suitable component of vehicle 208, such as the wheels, chassis, and/or steering mechanism of vehicle 208. Additionally or alternatively, one or more of the instruments may be incorporated into a mobile device of the user operating vehicle 208.

In some embodiments, vibration module 104 may utilize a particular type of device (or particular combination of devices) to collect a particular type of information. For example, vibration module 104 may utilize one or more IMUs to accurately detect vibrations within vehicle 208. In another example, vibration module 104 may utilize a GPS to determine the velocity of vehicle 208. In a further example, vibration module 104 may determine the velocity of vehicle 208 based on both an IMU and a GPS. In this example, combining the output of these devices may enable faster and/or more precise detection of the velocity of vehicle 208 (e.g., compared to utilizing only the output of the IMU or only the output of the GPS).

Vibration module 104 may store vibration information and/or any additional information in a variety of ways. In one example, vibration module 104 may store information within a server or database (such as computing device 202 and/or server 206 in FIG. 2). This server or database may be remote (e.g., external) to vehicle 208 or part of vehicle 208. In addition, the server or database may store information for any suitable period of time, such as permanently or until after the user has stopped operating vehicle 208. Additionally or alternatively, vibration module 104 may store information in a buffer. In such cases, the disclosed systems may determine whether vehicle 208 is currently operating on a sidewalk based on the information that is currently stored in the buffer. This buffer may be of any size such that it is capable of storing enough information for an accurate determination of whether vehicle 208 is operating on a sidewalk. For example, the buffer may be sized to store all of the information recorded during a 10 second interval. In some embodiments, the buffer may include and/or represent a circular buffer (e.g., a buffer that continuously replaces the oldest data stored within the buffer with new data). In this way, the disclosed systems may analyze collected information within sliding time windows. For example, during each second while vehicle 208 is operating, the disclosed systems may analyze information collected during the most recent 10 second interval. This analysis technique may enable accurate and fast (e.g., real-time) sidewalk-detection.

Furthermore, vibration module 104 may collect and store information to be used as training data for a machine learning algorithm. For example, vibration module 104 may record information about the vibrations, speed, and/or acceleration of one or more personal mobility vehicles when the personal mobility vehicles are known to be operating on particular types of pathways. Vibration module 104 may then store this information in connection with the particular pathway types. This information may be used to generate models of characteristics of personal mobility vehicles that are operating on various types of pathways.

Figure 4:
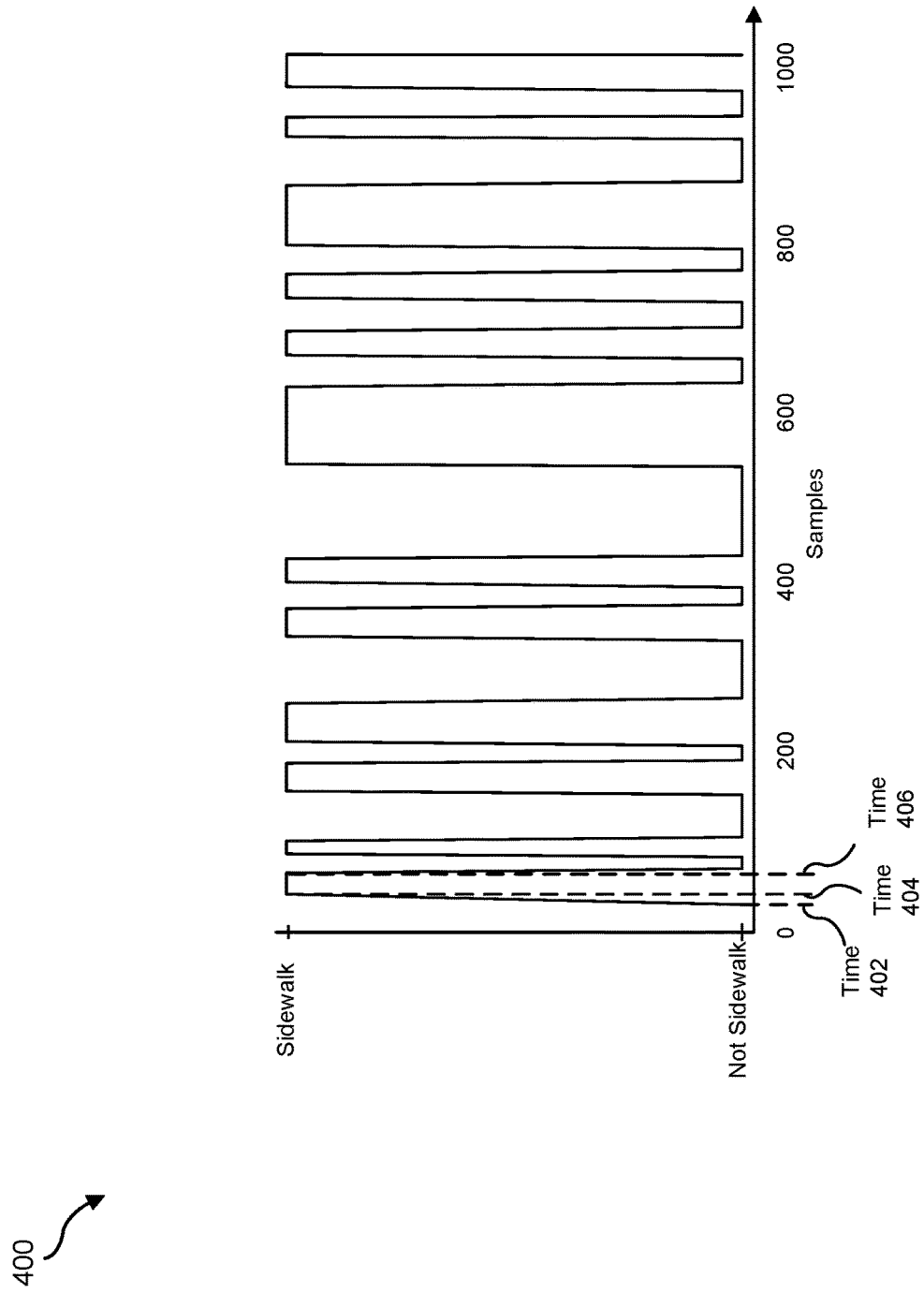
FIG. 4 is an illustration of an example plot of user input corresponding to operating a personal mobility vehicle on a sidewalk.

In some examples, a transportation service provider may collect at least a certain amount of training data to be used to train a machine learning algorithm. For example, one or more users may operate personal mobility vehicles on a variety of types of pathways for a certain period of time (e.g., 5 hours, 20 hours, etc.). During this time period, the users may provide real-time input indicating when their personal mobility vehicles switch from a road to a sidewalk (or switch from a sidewalk to a road). FIG. 4 illustrates an example of such input. In this example, a personal mobility vehicle may record 1000 samples of vibration signals while a user is driving the personal mobility vehicle. Plot 400 in FIG. 4 represents input provided by the user while these samples are being collected. This input may be provided in a variety of ways, such as by the user interacting with an application running within the personal mobility vehicle and/or the user's mobile device.

In one embodiment, the user may begin moving the personal mobility vehicle from a road to a sidewalk at a time 402. In this embodiment, the personal mobility vehicle may complete the move at a time 404. In addition, at a time 406, the user may begin moving the personal mobility vehicle back to a road. As shown in FIG. 4, plot 400 may indicate and/or represent input from the user corresponding to these moves. In some examples, the transportation service provider may generate a signature and/or model of vibration signals corresponding to sidewalks based at least in part on vibration signals recorded by the personal mobility vehicle between time 404 and time 406 (or any additional period of time when the personal mobility vehicle is known to be operating on a sidewalk). In one embodiment, the transportation service provider may disregard vibration signals recorded by the personal mobility vehicle between time 402 and time 404 (or any additional period of time when the personal mobility vehicle is transitioning to a different type of pathway). For example, during at least a portion of the period between time 402 and time 404, the front wheel of the personal mobility may be located on a sidewalk while the back wheel of the personal mobility vehicle may be located on a road. As such, the vibration signals recorded during this period may not definitively correspond to either a sidewalk or a road. In other embodiments, the transportation service provider may utilize such vibrations signals to generate a model corresponding to a personal mobility vehicle transitioning from a road to a sidewalk.

Returning to FIG. 3, at step 320 one or more of the systems described herein may determine that the one or more vibration signals correspond to a particular type of pathway for the personal mobility vehicle. For example, determination module 106 may, as part of computing device 202 in FIG. 2, determine that vibration signals 120 correspond to a particular type of pathway for vehicle 208.

The systems described herein may perform step 320 in a variety of ways and/or contexts. In some examples, determination module 106 may determine whether vehicle 208 is currently (e.g., in real-time) operating on a sidewalk. For example, determination module 106 may detect that vehicle 208 has recently (e.g., within the past 5 seconds, within the past 10 seconds, etc.) moved from a road (or another type of pathway suitable for use by vehicle 208) to a sidewalk. Additionally or alternatively, determination module 106 may determine that vehicle 208 operated on a sidewalk while moving along at least a portion of a route. For example, determination module 106 may perform a retrospective analysis of the information recorded by vibration module 104 after vehicle 208 has reached its intended destination.

Figure 5:
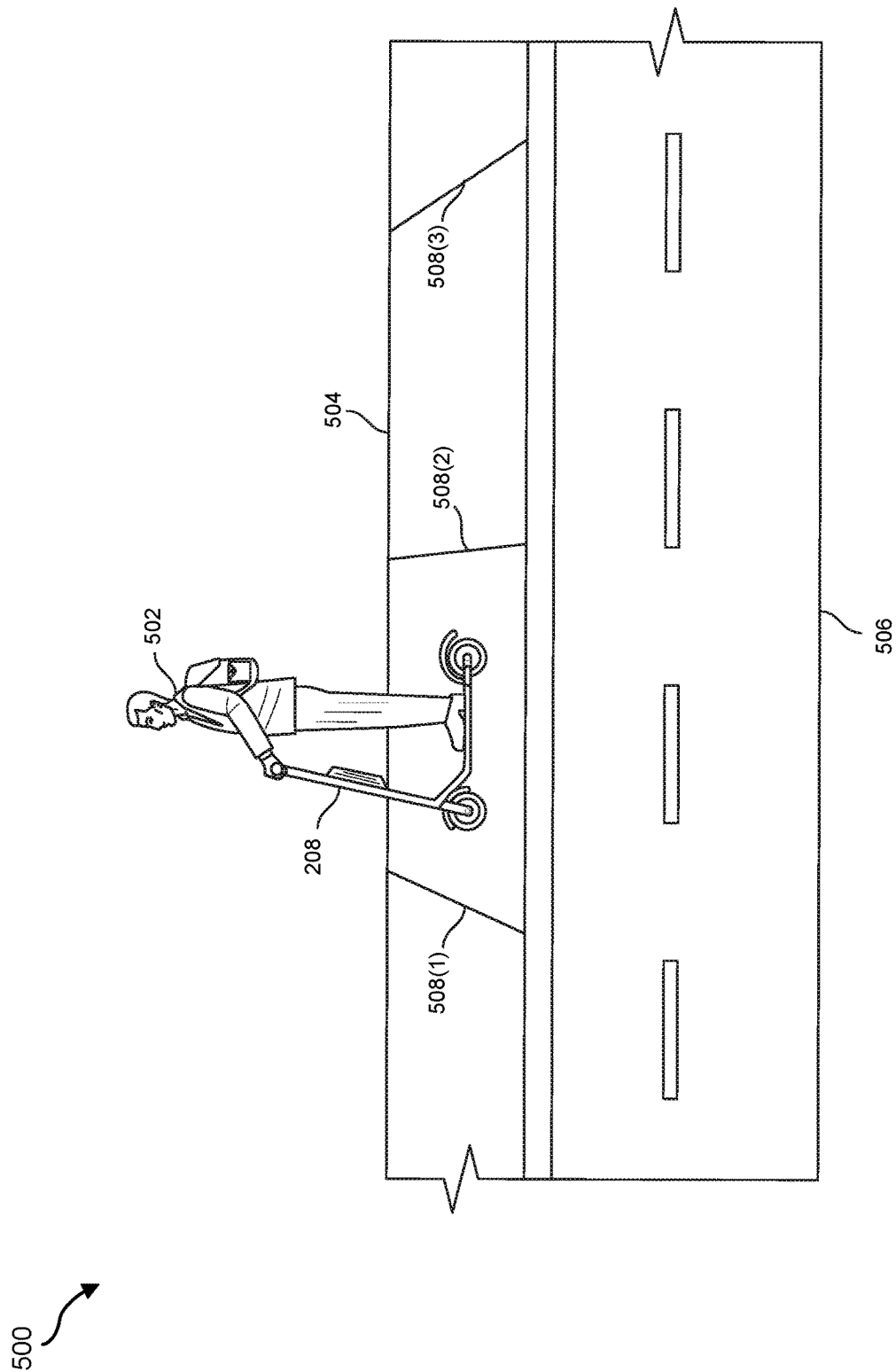
FIG. 5 is an illustration of an example system for sidewalk-detection for personal mobility vehicles.
Figure 6:
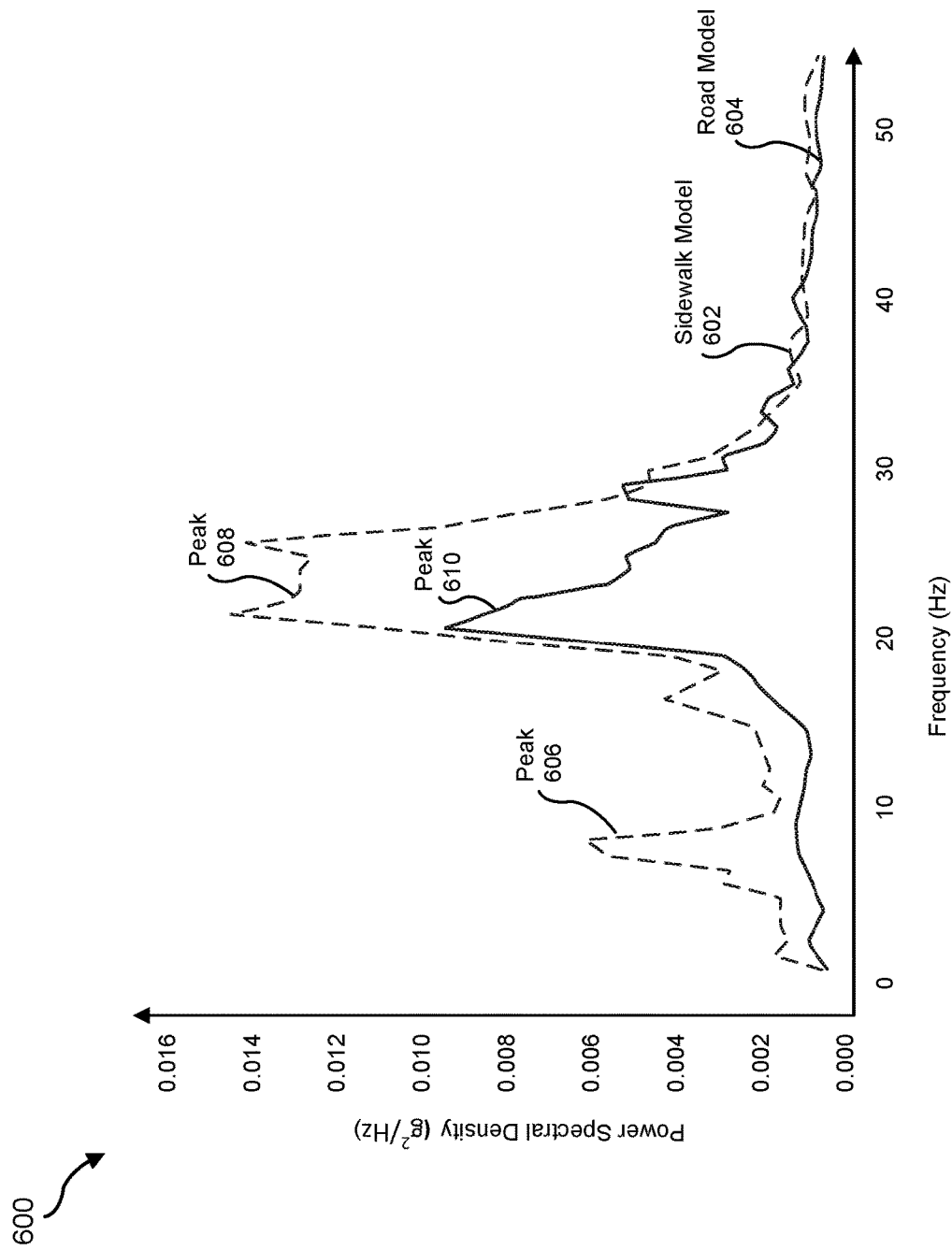
FIG. 6 is an illustration of example power spectrum analyses.

FIG. 5 illustrates an example system 500 that includes a user 502 operating vehicle 208 on a sidewalk 504. In this example, determination module 106 may determine that vehicle 208 has moved from a road 506 to sidewalk 504 based at least in part on vibration signals introduced into vehicle 208 due to one or more seams of sidewalk 504, such as seams 508(1), 508(2), and 508(3). The term "seam" or "sidewalk seam," as used herein, generally refers to any type or form of gap, joint, or point of connection between two or more components (e.g., concrete slabs, bricks, planks, etc.) of a sidewalk. In some embodiments, determination module 106 may determine whether vehicle 208 is operating on sidewalk 504 by comparing information recorded by vibration module 104 with one or more signatures or models that represent various types of pathways. FIG. 6 illustrates an example of such models. Specifically, FIG. 6 shows a power spectrum analysis 600 that includes a sidewalk model 602 (illustrated with a dashed line) and a road model 604 (illustrated with a solid line). In this example, sidewalk model 602 represents a typical power spectrum analysis of the vibrations within a personal mobility vehicle that is moving on a sidewalk. Similarly, road model 604 represents a typical power spectrum analysis of the vibrations within a personal mobility vehicle that is moving on a road.

Figure 7:
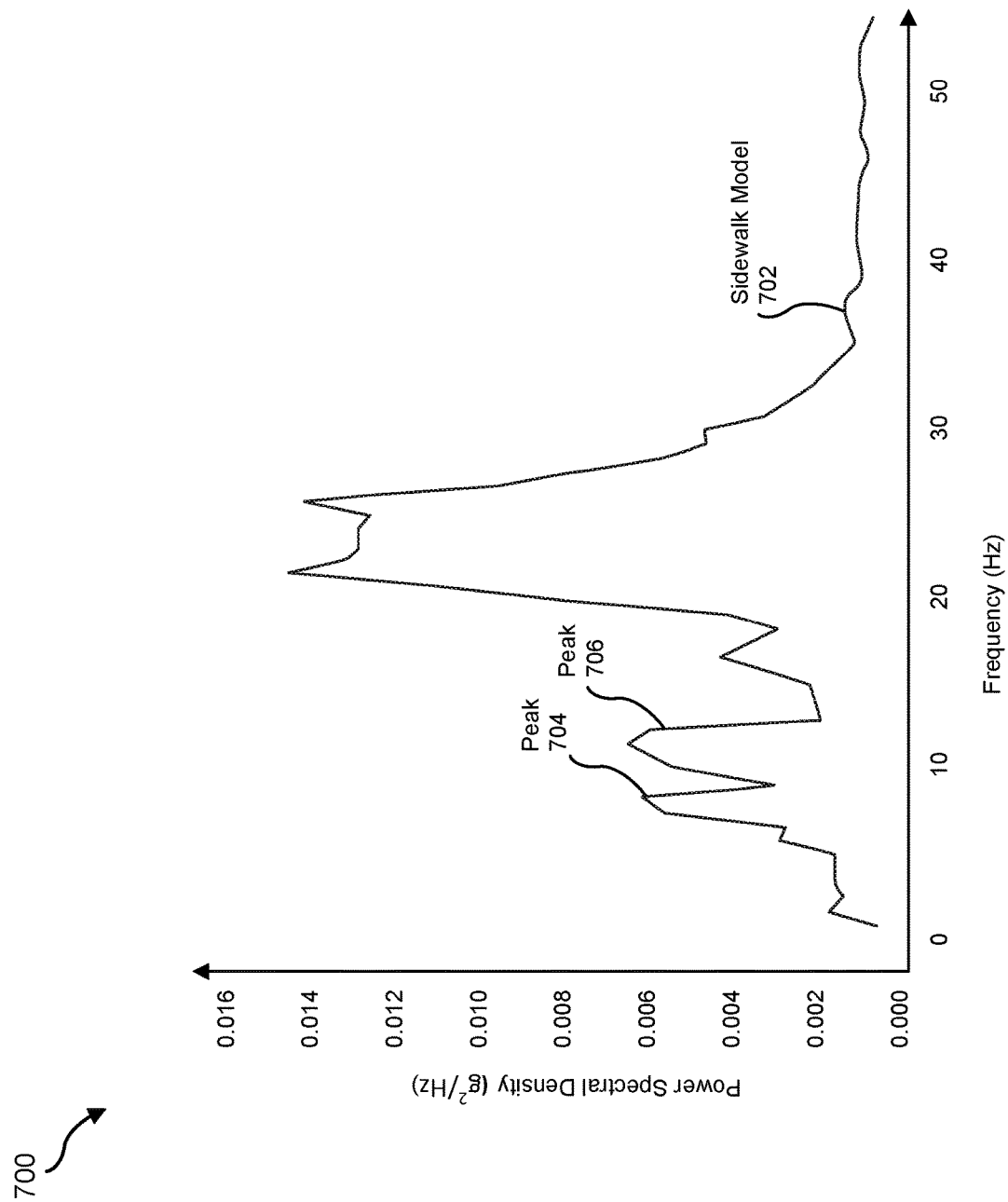
FIG. 7 is an illustration of an example power spectrum analysis.

In some embodiments, a peak 606 within sidewalk model 602 may correspond to and/or represent particular vibrations introduced into a personal mobility vehicle by a sidewalk seam (such as seam 508(1), 508(2), or 508(3) in FIG. 5). Notably, road model 604 does not contain a peak at the same frequency. Accordingly, determination module 106 may determine that vehicle 208 is operating on sidewalk 504 based at least in part on the presence of a peak similar to peak 606 within a power spectrum analysis of the vibrations within vehicle 208. In some embodiments, a power spectrum model for a sidewalk may include two peaks corresponding to vibrations introduced into personal mobility vehicles by sidewalks. These peaks may correspond to distinct vibrations within the front and back wheels of the personal mobility vehicle. FIG. 7 illustrates an exemplary power spectrum analysis 700 that includes two distinct vibration peaks. Specifically, as shown in FIG. 7, a sidewalk model 702 may include a peak 704 that corresponds to vibrations within the front wheel of a personal mobility vehicle and a peak 706 that corresponds to vibrations within the back wheel of the personal mobility vehicle.

Returning to FIG. 6, sidewalk model 602 may contain a peak 608 and road model 604 may contain a peak 610. In some embodiments, these peaks may correspond to resonant frequencies of personal mobility vehicles. The term "resonant frequency," as used herein, refers to any vibration frequency that is generally found within a personal mobility vehicle while the vehicle is moving (e.g., due to a component and/or inherent property of the vehicle). In one embodiment, a resonant frequency may correspond to movement of the front and/or back wheels of a personal mobility vehicle due to a spring force exerted by the wheels. In some examples, a personal mobility vehicle may include and/or be associated with multiple resonant frequencies. For example, a suspension within a personal mobility vehicle may produce and/or facilitate oscillations of various components of the vehicle.

In some embodiments, determination module 106 may determine whether vehicle 208 is operating on sidewalk 504 based at least in part on the power spectral density of the resonant frequency of vehicle 208. For example, while the frequencies of peaks 608 and 610 may be similar (e.g., within a certain range), as shown in FIG. 6, the resonant frequency of a personal mobility vehicle may be amplified, shifted, or otherwise changed when the personal mobility vehicle moves from a road to a sidewalk. Thus, determination module 106 may determine whether vehicle 208 is operating on sidewalk 504 based at least in part on whether the resonant frequency of vehicle 208 more closely corresponds to peak 608 or peak 610.

Additionally or alternatively, determination module 106 may determine whether vehicle 208 is operating on sidewalk 504 based at least in part on the expected resonant frequency (or expected resonant frequencies) of vehicle 208. For example, determination module 106 may determine that the type of suspension within vehicle 208 is expected to generate and/or known to be associated with a particular range or set of resonant frequencies. Determination module 106 may therefore search a power spectrum analysis of vehicle 208 for peaks corresponding to sidewalk seams at frequencies outside of the range or set of resonant frequencies. For example, determination module 106 may identify sidewalk peaks that do not overlap with resonant frequency peaks.

Furthermore, determination module 106 may determine whether vehicle 208 is operating on a sidewalk based at least in part on periodically detecting peaks corresponding to sidewalk seams within power spectrum analyses of vehicle 208. For example, a sidewalk may contain seams at regular (or approximately regular) intervals (e.g., every two feet, every three feet, etc.). As such, determination module 106 may expect to detect, within a personal mobility vehicle moving on a sidewalk, vibrations induced by sidewalk seams at corresponding time intervals. For example, based on the velocity of vehicle 208, determination module 106 may determine points in time at which to expect the vibrations to be present within vehicle 208. Furthermore, determination module 106 may determine that peaks in the vertical acceleration of vehicle 208 are to be expected at the same points in time. For example, the seams within the sidewalk may cause vehicle 208 to bounce or otherwise move upward, thereby increasing the vertical acceleration of vehicle 208 while vehicle 208 moves over the seams.

Figure 8:
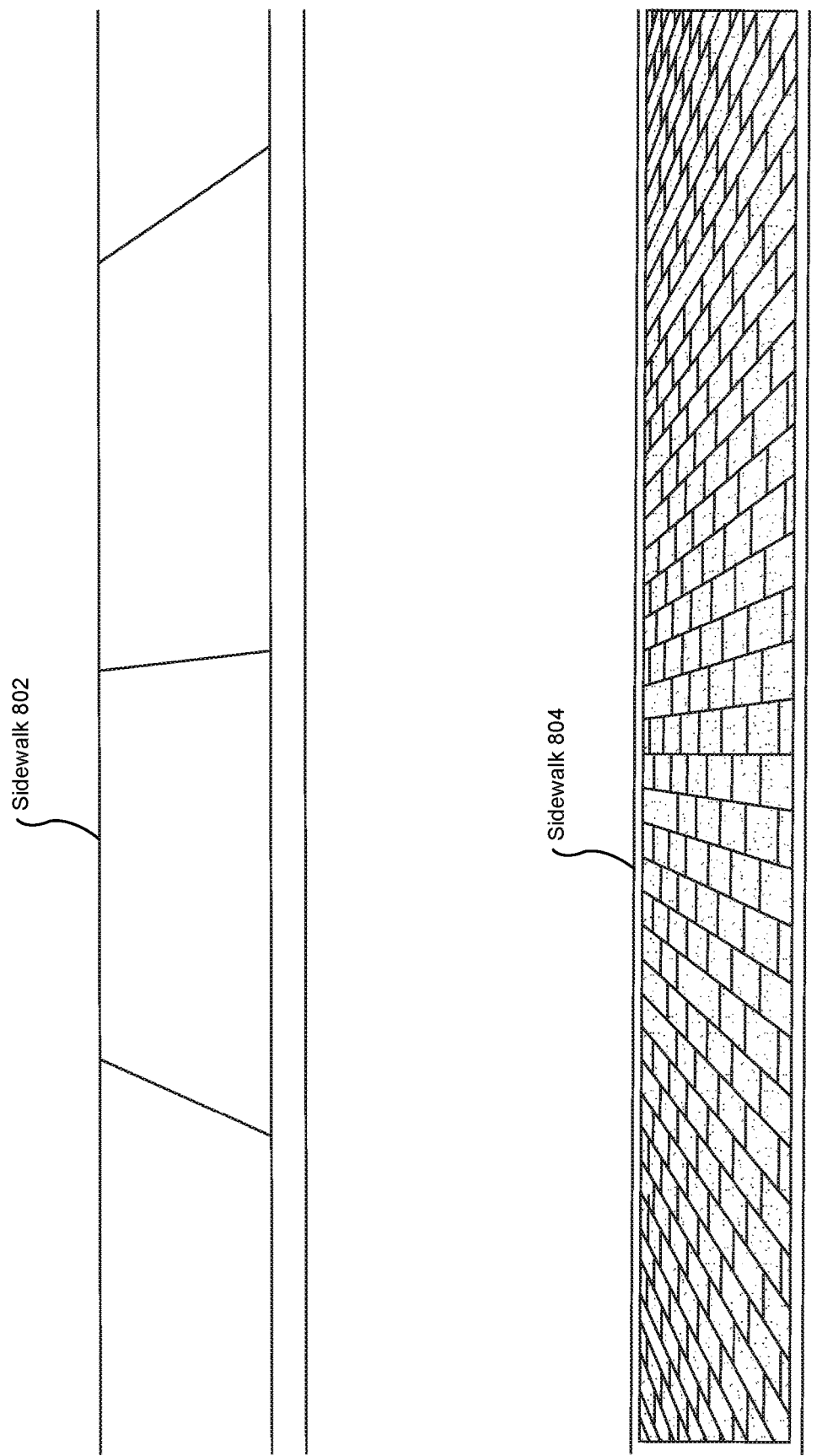
FIG. 8 is an illustration of example types of sidewalks.

The spacing of seams within a sidewalk may vary and/or depend on the design, composition, and/or material of the sidewalk. As such, determination module 106 may compare information collected by vibration module 104 with models that represent and/or describe various types of sidewalks. FIG. 8 illustrates several example types of sidewalks. Specifically, FIG. 8 shows a sidewalk 802 that is composed of concrete slabs or blocks. The seams within sidewalk 802 may be several feet apart. In contrast, a sidewalk 804 in FIG. 8 may be composed of bricks. The seams between these bricks may be only several inches apart. Accordingly, the seams of sidewalk 804 may introduce vibration peaks and/or vertical acceleration peaks into vehicle 208 with a greater frequency than the seams of sidewalk 802 (e.g., when vehicle 208 moves along both sidewalks at the same speed).

Figure 9:
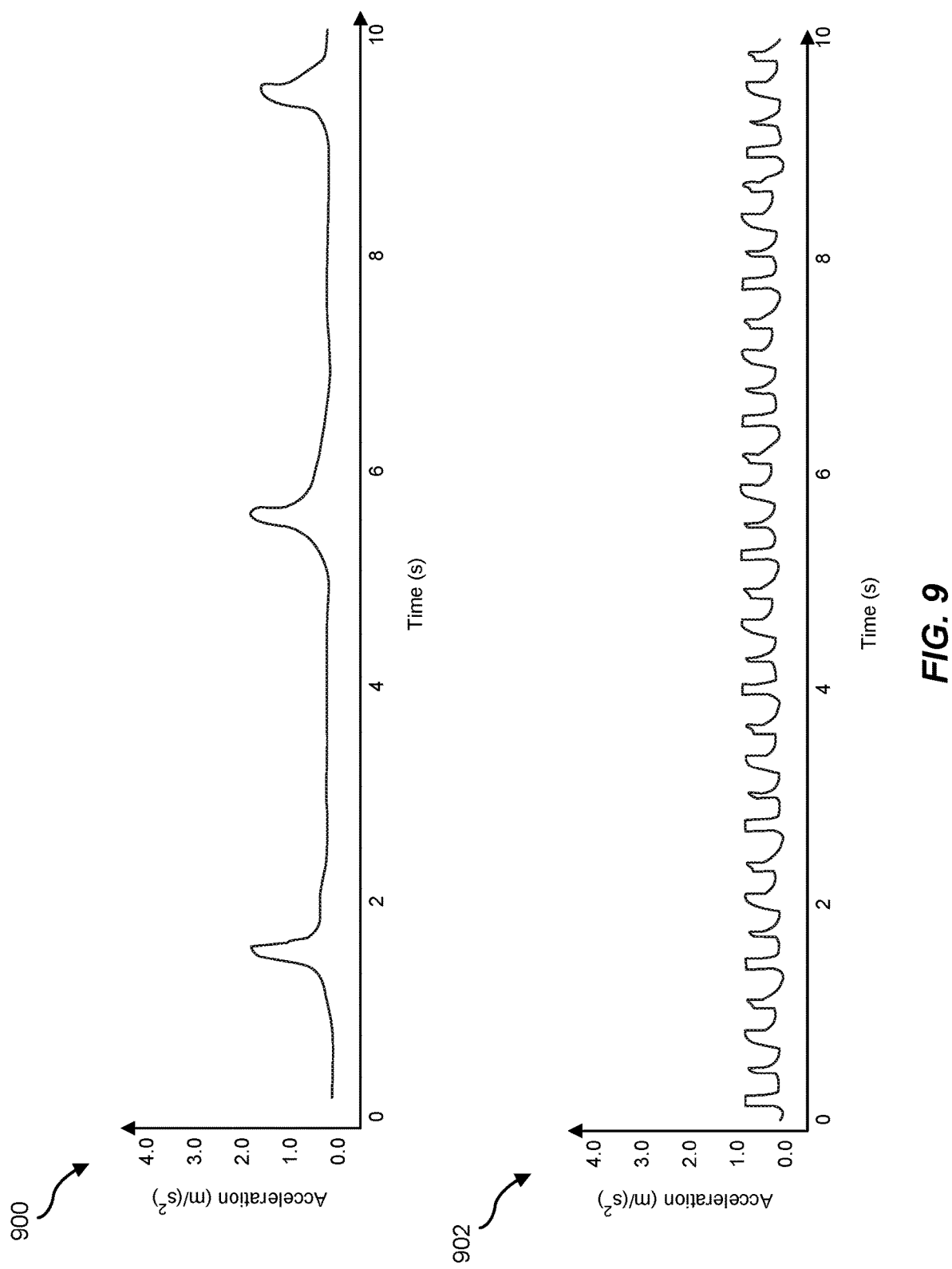
FIG. 9 is an illustration of example plots corresponding to the vertical acceleration of a personal mobility vehicle.

FIG. 9 illustrates a plot 900 that represents the vertical acceleration of vehicle 208 while vehicle 208 is operating on sidewalk 802 at a certain speed during a 10 second interval. FIG. 9 also illustrates a plot 902 that represents the vertical acceleration of vehicle 208 while vehicle 208 is operating on sidewalk 804 at the certain speed during a 10 second interval. As shown in FIG. 9, sidewalk 804 may introduce vertical acceleration peaks into vehicle 208 at a significantly faster rate (e.g., 10 times more frequently) than sidewalk 802. As an example, determination module 106 may compare the information recorded by vibration module 104 with models that take into account the differences between sidewalk 802 and sidewalk 804. For example, the vibration peak corresponding to the seams of sidewalk 802 may occur at a different frequency than the vibration peak corresponding to the seams of sidewalk 804. Additionally or alternatively, texture differences between the concrete of sidewalk 802 and the brick of sidewalk 804 may introduce various background vibrations (e.g., vibrations with relatively low strength) into vehicle 208. The models for sidewalk 802 and sidewalk 804 may reflect these differences, as well as any additional differences. In some embodiments, determination module 106 may utilize such models to identify a particular type of ground surface (e.g., concrete or brick) on which vehicle 208 is operating. In other embodiments, determination module 106 may utilize the models to make a binary classification of whether vehicle 208 is operating on a sidewalk or not operating on a sidewalk.

In some examples, determination module 106 may implement a machine learning algorithm that classifies the pathway on which vehicle 208 is operating based on a set of features extracted from the information recorded by vibration module 104. This machine learning algorithm may determine whether the features, as a group, correspond to a model of a particular type of pathway. As an example, this machine learning algorithm may determine whether vehicle 208 was moving on a sidewalk at any point within a particular time interval based on a combined analysis of (1) the average power spectral density of vibrations with one or more particular frequencies (e.g., 5 hertz, 9 hertz, etc.) within vehicle 208 during the time interval, (2) the average vertical acceleration of vehicle 208 during the time interval, and (3) the average velocity of vehicle 208 during the time interval. The machine learning algorithm may consider any number of features, such as 10 features, 20 features, etc. Notably, while in some cases the machine learning algorithm may consider features relevant to the user operating vehicle 208 (such as the user's weight and/or the position of the user on vehicle 208), the machine learning algorithm may be trained to accurately perform sidewalk-detection without analyzing user-specific data.

Determination module 106 may implement a variety of types of machine learning algorithms. For example, the machine learning algorithm may utilize any one or combination of classification techniques, including decision trees, random forest tools, nearest neighbor algorithms, naive Bayes classifiers, neural networks, linear regression, and the like.

Figure 10:
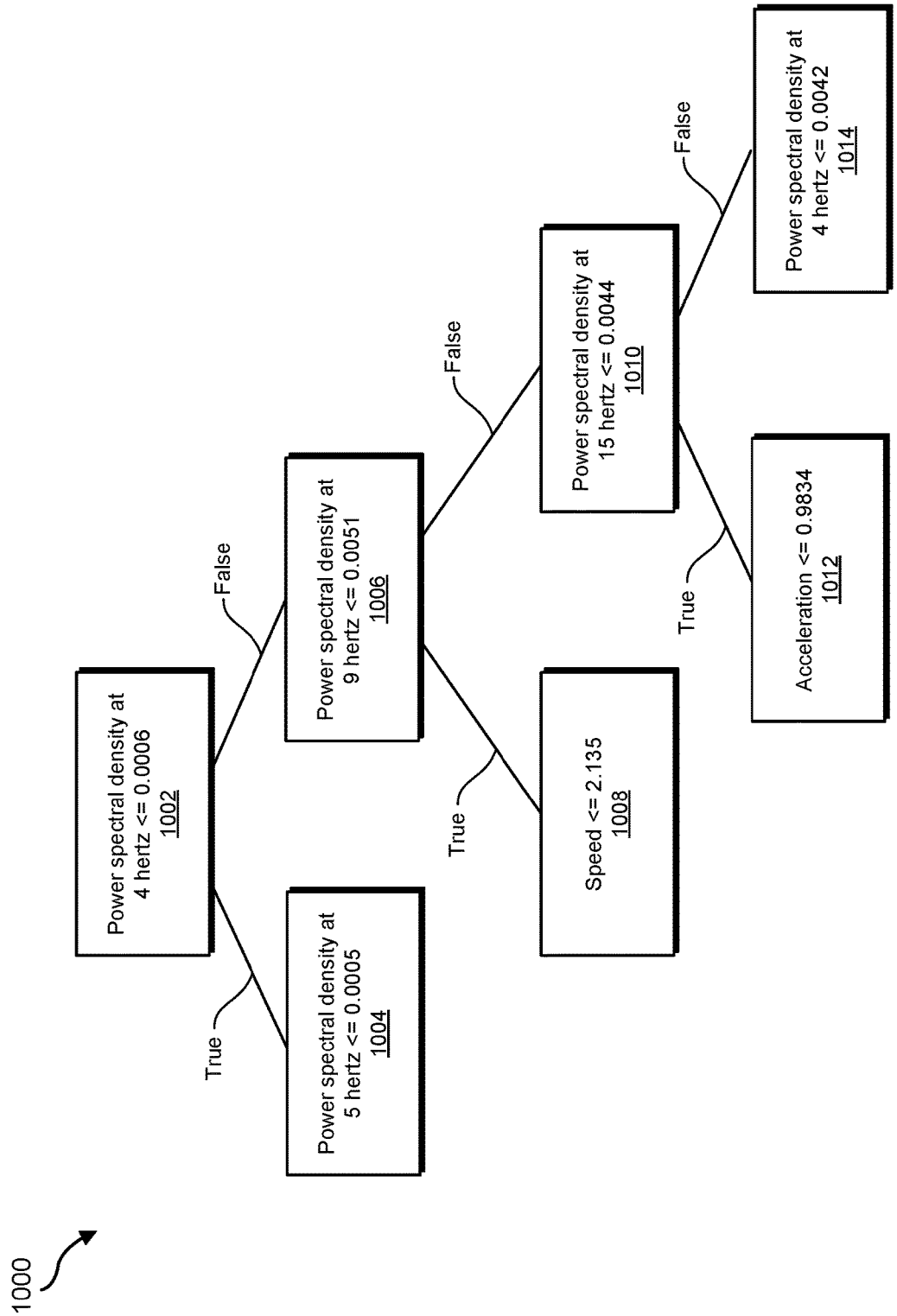
FIG. 10 is an illustration of an example portion of a decision tree.

FIG. 10 illustrates a portion of an exemplary decision tree 1000 that is trained to classify pathways as roads or sidewalks. In this example, decision tree 1000 may classify a pathway by traversing through nodes of a graph based on whether vibration signals detected within vehicle 208 while vehicle 208 was operating on the pathway match one or more conditions of each node. As shown in FIG. 10, each node of decision tree 1000 may include and/or represent a different condition. For example, node 1002 may include the condition of the power spectral density of vibrations at 4 hertz being less than or equal to 0.0006 $g^2$/Hz. In some examples, determination module 106 may begin traversing through decision tree 1000 by determining whether vibration signals detected within vehicle 208 meet the condition of node 1002. If the vibration signals meet the condition of node 1002, determination module 106 may proceed to node 1004. If the vibration signals do not meet the condition of node 1002, determination module 106 may proceed to node 1006. In one embodiment, the condition of node 1006 (i.e., the power spectral density of vibrations at 9 hertz being less than or equal to 0.0006 $g^2$/Hz) may correspond to a vibration peak such as peak 606 within FIG. 6. After proceeding to either node 1004 or node 1006, determination module 106 may repeat the process of evaluating the condition at the node. Once determination module 106 has traversed along a particular branch of decision tree 1000 (e.g., has reached the end of a branch), determination module 106 may classify the pathway based at least in part on the particular branch and/or the nodes within the particular branch.

FIG. 11 illustrates a portion of an exemplary random forest model 1100 that is trained to classify pathways as roads or sidewalks. In one example, random forest model 1100 may include and/or represent a combination and/or ensemble of decision tree classifiers (such as decision tree 1000). In one embodiment, random forest model 1100 may assign weights to individual features within a set of features used to classify a pathway. For example, random forest model 1100 may indicate and/or determine that the power spectral density of vibrations at 10 hertz within a personal mobility vehicle is more indicative of whether the vehicle is operating on a sidewalk than the power spectral density of vibrations at 15 hertz within the vehicle. Accordingly, as illustrated in FIG. 11, random forest model 1100 may assign a higher importance to the power spectral density of vibrations at 10 hertz than the power spectral density of vibrations at 15 hertz.

Figure 12:
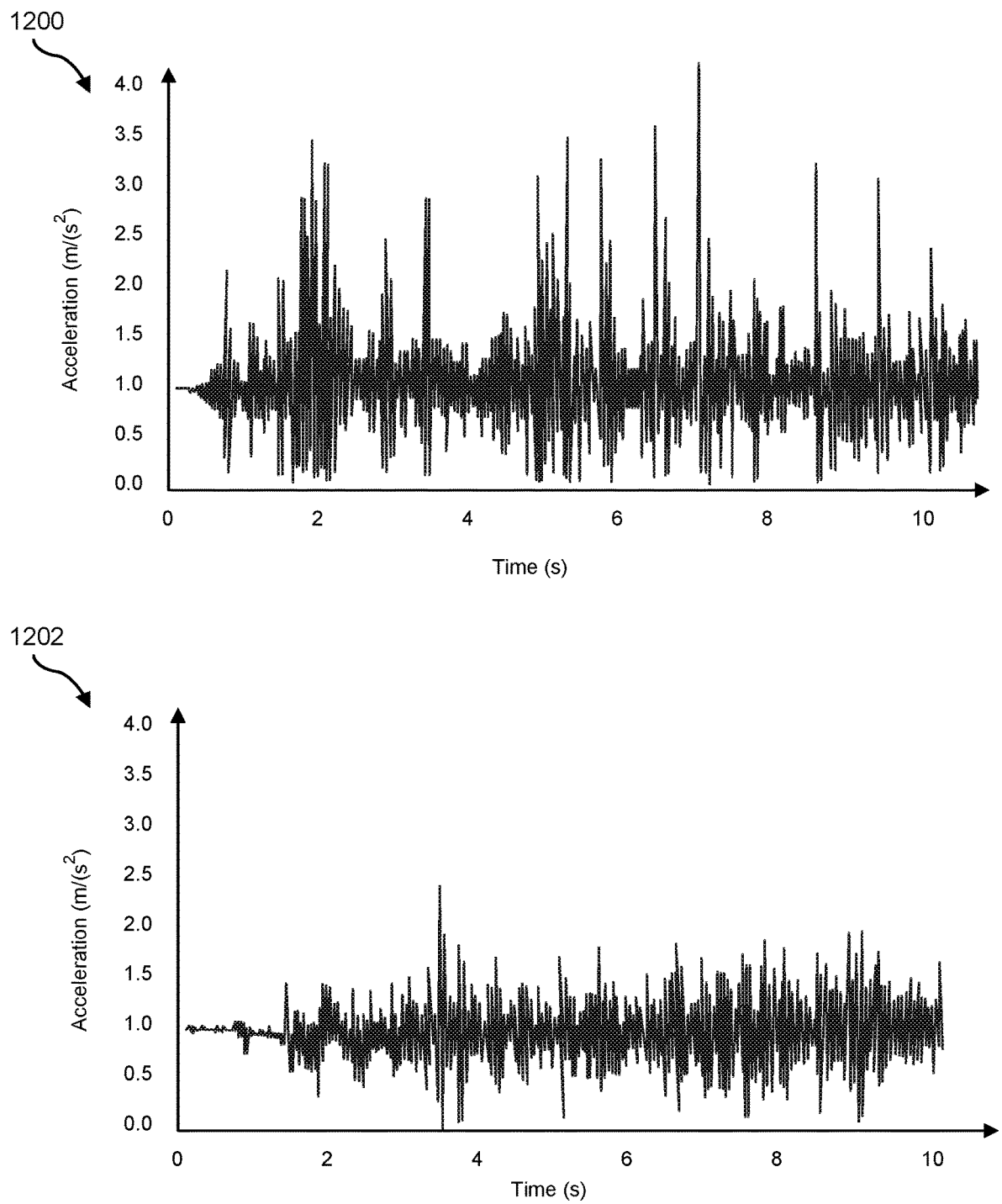
FIG. 12 is an illustration of example plots corresponding to the vertical acceleration of a personal mobility vehicle.

As also illustrated in FIG. 11, random forest model 1100 may assign a higher importance to the power spectral density of vibrations at some frequencies than the vertical acceleration of vehicle 208. In other words, the vertical acceleration of vehicle 208 may contribute to the classification of a pathway but this feature may not be an independent or standalone indicator of a pathway type. FIG. 12 illustrates a plot 1200 corresponding to the vertical acceleration of a personal mobility vehicle operating on a sidewalk. In addition, FIG. 12 illustrates a plot 1202 corresponding to the vertical acceleration a personal mobility vehicle operating on a road. In some examples, random forest model 1100 (or any additional machine learning algorithm) may determine whether vehicle 208 is operating on a sidewalk or a road based at least in part on determining whether the vertical acceleration of vehicle 208 more closely corresponds to plot 1200 or plot 1202. For example, the machine learning algorithm may classify the pathway on which vehicle 208 is operating based on a combined analysis of the vertical acceleration of vehicle 208 and other factors (such as the resonant frequency of vehicle 208 and/or frequency peaks within the frequency spectrum of vibrations within vehicle 208).

The disclosed systems may implement any type or form of machine learning algorithm in addition to or instead of the algorithms illustrated in FIGS. 10 and 11. In addition, the machine learning algorithm may be supervised, unsupervised, or semi-supervised. Furthermore, the machine learning algorithm may be trained using any suitable amount and/or type of training data. In some embodiments, the machine learning algorithm may be trained based on training data representative of multiple types of pathways, such as smooth roads, roads with potholes, sidewalks made of various materials (such as concrete, brick, wood, and gravel), sidewalks with seams at regular intervals, sidewalks with seams at irregular intervals, roads with high volumes of traffic, roads with low volumes of traffic, and/or any additional type of pathway.

In some examples, the machine learning algorithm may return a probability that vehicle 208 is operating on a sidewalk. In one embodiment, the machine learning algorithm may determine this probability based at least in part on the number or percentage of features within a set of features that match a model of a sidewalk. Additionally or alternatively, the machine learning algorithm may determine the probability based at least in part on the weight and/or importance of the matching features.

In some embodiments, determination module 106 may classify the pathway on which vehicle 208 is operating as a sidewalk in the event that the probability returned by the machine learning algorithm exceeds a threshold probability (e.g., a probability of 50%, 55%, 75%, etc.). In general, a higher threshold probability may correspond to a higher rate of false negatives (e.g., classifying sidewalks as roads), a lower rate of false positives (e.g., classifying roads as sidewalks), and a lower rate of true positives (e.g., accurately classifying sidewalks as sidewalks). The reverse may be true for a lower threshold probability. In some examples, a transportation service provider may wish to both maximize the rate of true positives and minimize the rate of false positives of a machine learning algorithm. Due to the positive correlation between these rates, it may be difficult to minimize and/or eliminate false positives while maintaining at least a certain rate (e.g., 85%, 90%, etc.) of true positives. As such, the transportation service provider may select a threshold probability that results in an appropriate and/or desired balance of true positives and false positives.

Figure 13:
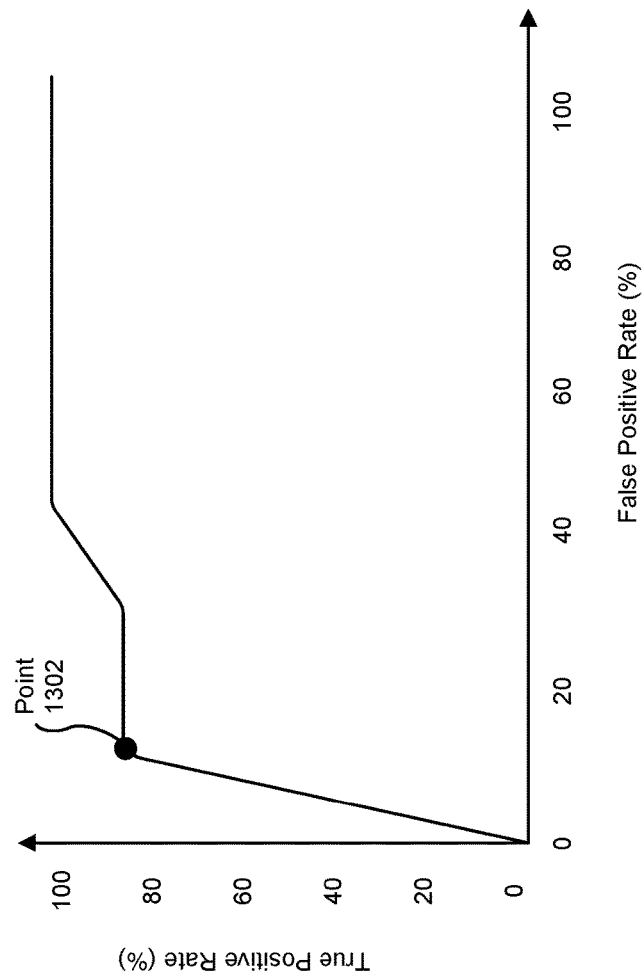
FIG. 13 is an illustration of an example plot of the relationship between the false positive rate of a machine learning algorithm and the true positive rate of the machine learning algorithm.

FIG. 13 illustrates a plot 1300 that describes an exemplary relationship between the rates of false positives and true positives of a machine learning algorithm. In some embodiments, a particular false positive rate and the corresponding true positive rate may correspond to and/or be the result of a particular threshold probability implemented by the machine learning algorithm. For example, when implementing a threshold probability of 40%, a certain machine learning algorithm may have a false positive rate of 5% and a true positive rate of 60%. In some embodiments, a transportation service provider may utilize a relationship such as the one illustrated in plot 1300 to select an optimal and/or appropriate threshold probability. For example, the transportation service provider may determine that the maximum acceptable rate of false positives for a particular application of a machine learning algorithm is 12% and therefore select a threshold probability corresponding to that rate. Additionally or alternatively, the transportation service provider may select a threshold probability based at least in part on the shape, slope, and/or rate of change of a plot such as plot 1300. For example, a transportation service provider may select a threshold probability corresponding to a point 1302 in FIG. 13 due to the rate of false positives increasing significantly after point 1302 and/or the rate of true positives not increasing significantly after point 1302.

In some examples, all or a portion of a machine learning algorithm may be implemented within vehicle 208. For example, determination module 106 may implement the machine learning algorithm while operating within and/or as part of computing device 202 of vehicle 208 (as shown in FIG. 2). Additionally or alternatively, at least a portion of the machine learning algorithm may be implemented within a remote server (such as server 206 in FIG. 2). As an example, determination module 106 within computing device 202 of vehicle 208 may extract a set of features from information collected by collection module 104 and then send the set of features to server 206. Server 206 may classify, based on the set of features, the type of pathway on which vehicle 208 is operating. Server 206 may then store this classification and/or return the classification to computing device 202.

Figure 14:
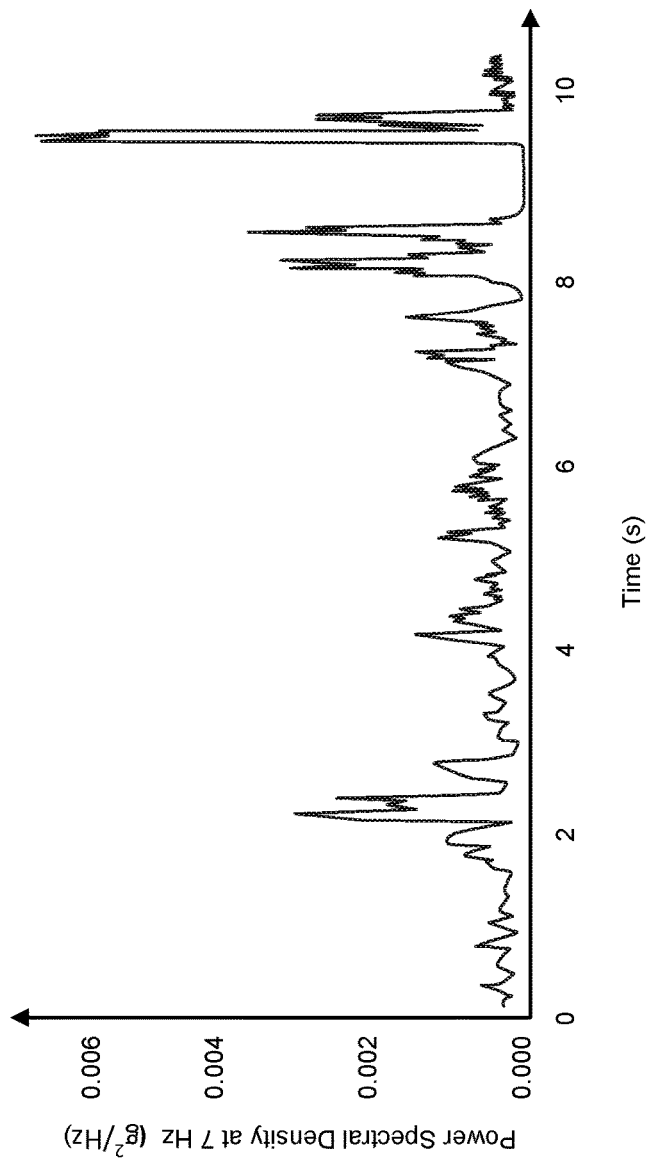
FIG. 14 is an illustration of an example plot corresponding to the power spectral density of vibrations within a personal mobility vehicle.
Figure 15:
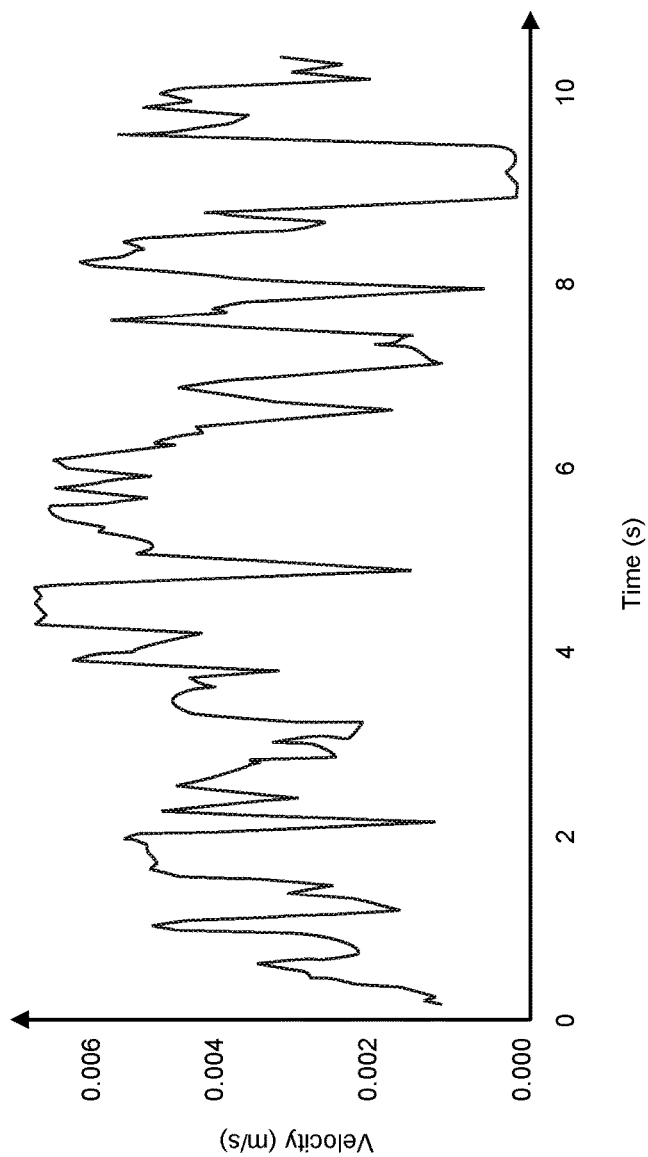
FIG. 15 is an illustration of an example plot corresponding to the velocity of a personal mobility vehicle.
Figure 16:
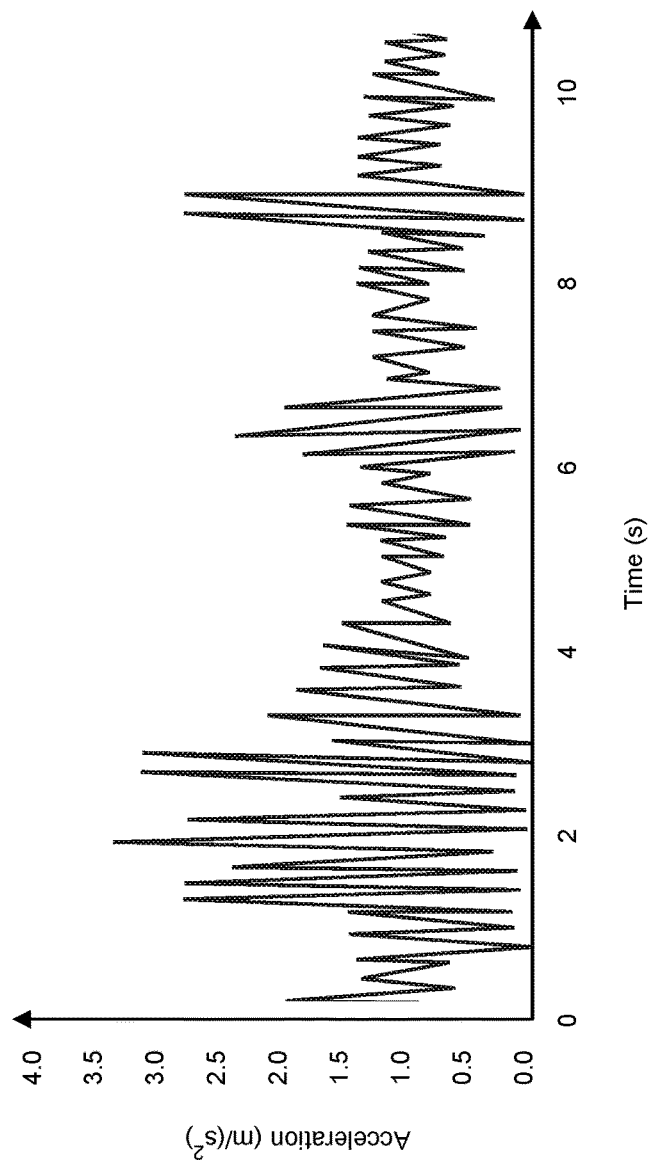
FIG. 16 is an illustration of an example plot corresponding to the vertical acceleration of a personal mobility vehicle.

FIGS. 14-16 illustrate exemplary features that may be extracted by computing device 202 and sent to server 206 for analysis. Specifically, FIG. 14 illustrates a plot 1400 describing the power spectral density of vibrations with a frequency of 7 hertz detected within vehicle 208 during a certain 10 second interval. FIG. 15 illustrates a plot 1500 describing the velocity of vehicle 208 during the 10 second interval. In addition, FIG. 16 illustrates a plot 1600 describing the vertical acceleration of vehicle 208 during the 10 second interval. In some embodiments, determination module 106 may (as part of computing device 202) generate and/or extract these features from raw data recorded by vibration module 104. Determination module 106 may then send these features (and any additional features) to server 206 for further processing and/or analysis.

Implementing a machine learning algorithm across both a computing device integrated into a personal mobility vehicle and a backend server may provide several benefits and advantages. For example, extracting the set of features within computing device 202 may reduce the amount of data to be transmitted to server 206, thereby reducing the bandwidth and/or time involved in transmitting the data. In addition, server 206 may have greater processing power than computing device 202 and may, therefore, provide a faster and/or more accurate classification than computing device 202. Implementation of the machine learning algorithm may be split across computing device 202 and server 206 in any suitable way to improve and/or maximize the results of the algorithm.

Returning to FIG. 3, at step 330 one or more of the systems described herein may generate a feedback signal corresponding to the particular type of pathway. For example, generation module 108 may, as part of computing device 202 in FIG. 2, generate feedback signal 122 corresponding to the particular type of pathway.

The systems described herein may perform step 330 in a variety of ways and/or contexts. In some examples, generation module 108 may generate a feedback signal that encourages the user to operate vehicle 208 on a road instead of a sidewalk. For example, in response to detecting that vehicle 208 is currently operating on a sidewalk, generation module 108 may generate a visual display (e.g., a pop-up window, text box, symbol, graphic, etc.) that directs the user driving vehicle 208 to promptly (or as soon as it is safe or possible) move vehicle 208 off the sidewalk. In some embodiments, this visual display may include text or a written message to be presented within a graphical user interface (GUI) integrated into vehicle 208 and/or the user's mobile device.

Figure 17:
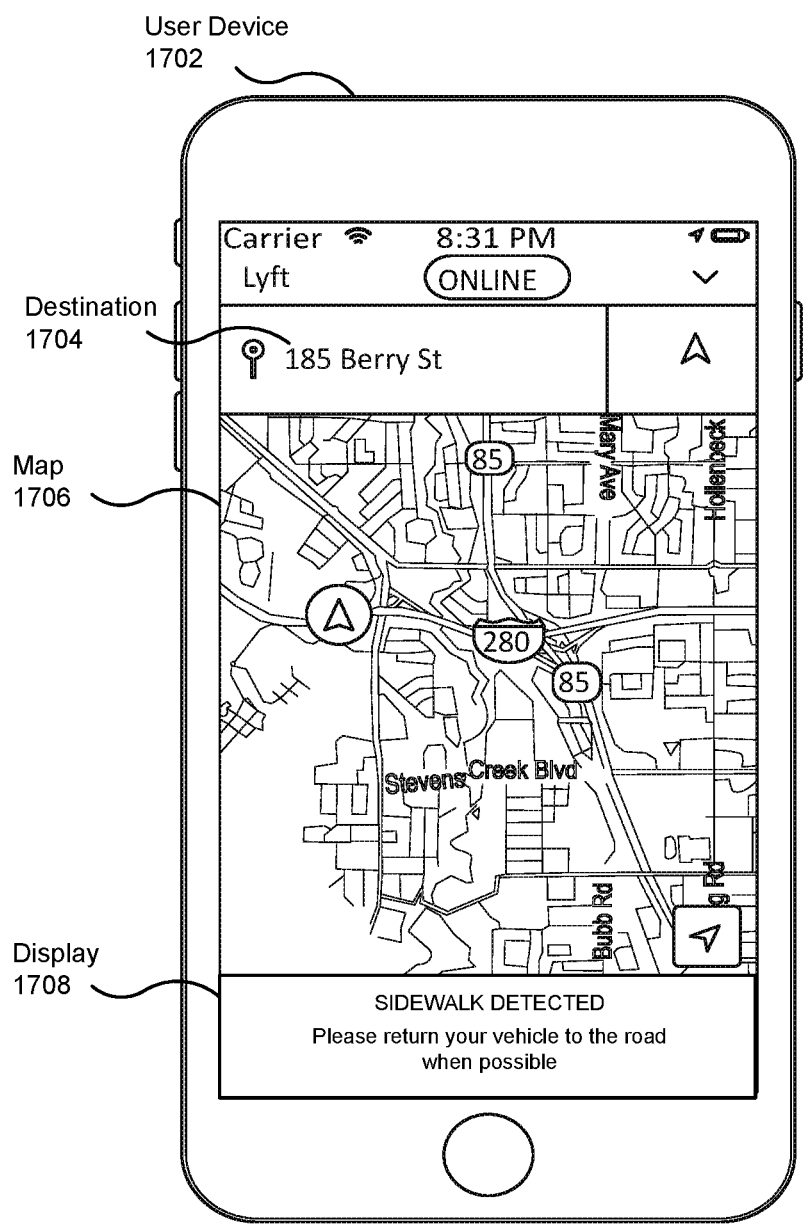
FIG. 17 is an illustration of an example feedback signal presented via a user interface.

FIG. 17 illustrates an example visual display that may be presented to the user. In this example, a GUI of a user device 1702 may display various pieces of information to the user while the user is operating vehicle 208. For example, the GUI may display a destination 1704 that corresponds to the intended destination of vehicle 208 and a map 1706 that facilitates navigating the user to destination 1704. In response to detecting that vehicle 208 is operating on a sidewalk, generation module 108 may generate a display 1708 that includes text directing the user to return vehicle 208 to a road when possible. Display 1708 may include any additional or alternative type of content or media. For example, display 1708 may include a light indicating that sidewalk usage has been detected. As a specific example, display 1708 may include a green light while vehicle 208 is on a road and a red light while vehicle 208 is on a sidewalk. Generation module 108 may generate various other types of feedback signals in response to detecting that vehicle 208 is operating on a sidewalk, such as an audio feedback signal (e.g., a beep or chime) and/or a haptic feedback signal (e.g., vibrations within the handlebars of vehicle 208 and/or the user's mobile device).

In some embodiments, generation module 108 may generate a feedback signal after determining that the user has finished operating vehicle 208. For example, to avoid potentially distracting the user while vehicle 208 is in motion, generation module 108 may generate a feedback signal to be transmitted to the user after vehicle 208 has reached its intended destination. In one embodiment, this feedback signal may include a visual display that directs the user to avoid operating personal mobility vehicles on sidewalks in the future.

Additionally or alternatively, generation module 108 may generate a feedback signal that at least partially restricts the functionality of vehicle 208. For example, generation module 108 may generate an instruction (e.g., computer-readable code or another type of message) that directs a processing device that controls the operation of vehicle 208 to reduce the speed of vehicle 208. In some embodiments, this instruction may direct the processing device to limit the maximum speed of vehicle 208 to a certain speed (e.g., 10 miles per hour, 15 miles per hour, etc.) for a certain period of time (e.g., for 5 minutes, for 10 minutes, for the duration of the user's ride, while vehicle 208 is on a sidewalk, etc.). In one example, the instruction may gradually slow down vehicle 208 to the maximum speed (e.g., the instruction may control the deceleration of vehicle 208 until vehicle 208 reaches the maximum speed). Alternatively, the instruction may allow vehicle 208 to continue operating at speeds above the maximum speed until the user directs vehicle 208 to operate below the maximum speed. Once the maximum speed has been reached, the instruction may prevent vehicle 208 from exceeding the maximum speed. Additionally or alternatively, the instruction may set the maximum speed as the current speed of vehicle 208 (e.g., the instruction may prevent vehicle 208 from accelerating beyond the speed of vehicle 208 when vehicle 208 began operating on a sidewalk).

Furthermore, in some examples, the maximum speed may be related to and/or based on the number of times the user has previously driven a personal mobility vehicle on a sidewalk (e.g., the total number of times within the user's past personal mobility vehicle rides, the number of times within the past several rides, and/or the number of times within the current ride). As an example, generation module 108 may limit the maximum speed of vehicle 208 to 15 miles per hour after the first 5 sidewalk-detections for the user and limit the maximum speed of vehicle 208 to 12 miles per hour after a subsequent sidewalk-detection. In some embodiments, limiting the maximum speed of vehicle 208 may inconvenience the user, thereby encouraging the user to move vehicle 208 to a road and/or avoid driving personal mobility vehicles on sidewalks in the future.

In further examples, generation module 108 may generate a feedback signal to be sent to an online log, a dashboard, and/or a database (such as server 206) that manages transportation services for one or more users. This feedback signal may include a message indicating an amount of time and/or a number of times the user operated vehicle 208 on a sidewalk. As will be explained in greater detail below, this information may be aggregated and/or analyzed by a transportation service provider. Additionally or alternatively, generation module 108 may generate a message that identifies a location of one or more detected sidewalks. In some embodiments, this information may be incorporated into maps or databases that identify the locations of sidewalks.

Returning to FIG. 3, at step 340 one or more of the systems described herein may transmit the feedback signal corresponding to the particular type of pathway. For example, transmission module 110 may, as part of computing device 202 in FIG. 2, transmit feedback signal 122.

The systems described herein may perform step 340 in a variety of ways and/or contexts. In the event that generation module 108 generated a visual display to be presented to the user, transmission module 110 may transmit the display to a GUI viewed by the user. For example, transmission module 110 may render display 1708 within the GUI of user device 1702 (as illustrated in FIG. 17). Transmission module 110 may render display 1708 within the GUI for a set period of time (e.g., 3 seconds, 5 seconds, etc.) or until detecting that the user has moved vehicle 208 off the sidewalk. Transmission module 110 may facilitate providing any additional type of feedback to the user, such as by providing audio and/or haptic feedback via user device 1702 or vehicle 208.

In the event that generation module 108 generated an instruction to limit the maximum speed of vehicle 208, transmission module 110 may transmit the instruction to a processing device that controls the speed of vehicle 208 (e.g., physical processor 130 in FIG. 1 and/or another processing device that controls the motor of vehicle 208). The processing device may execute the instruction such that the speed of vehicle 208 is kept below the maximum speed specified by the instruction for the period of time specified by the instruction. In some examples, executing the instruction may override all or a portion of the user's input to vehicle 208 regarding the speed of vehicle 208. For example, the instruction may prevent vehicle 208 from exceeding the maximum speed despite the user continuing to turn the throttle of vehicle 208 or otherwise directing vehicle 208 to accelerate.

In the event that generation module 108 generated a message directed to a database that manages transportation services for the user, transmission module 110 may transmit the message to the database (via, e.g., a cellular network, Wi-Fi, or other wireless network). The database may use information transmitted by transmission module 110 in a variety of ways. In some examples, the database may track the frequency with which the user operates personal mobility vehicles on sidewalks. In the event that this frequency exceeds a threshold frequency, a transportation service provider may begin restricting transportation services provided to the user. For example, the transportation service provider may temporarily or permanently prevent the user from accessing personal mobility vehicles managed by the transportation service provider. In another example, the transportation service provider may reduce the maximum speed of personal mobility vehicles accessed by the user in the future. Furthermore, in some embodiments, the database may aggregate information about sidewalk detections associated with multiple users. For example, server 206 may track rates and/or trends of users operating personal mobility vehicles on sidewalks. In one embodiment, such information may be provided to city planners and/or local government agencies for use in generating policies to reduce the frequency of users operating personal mobility vehicles on sidewalks. For example, in response to an increase of sidewalk-detections within a city, the city's government may implement and/or increase fines or other penalties for users that operate personal mobility vehicles on sidewalks.

In some embodiments, the disclosed systems may evaluate the accuracy of one or more sidewalk classifications. For example, as discussed in connection with FIG. 13, the disclosed systems may determine rates of false positives, false negatives, and/or true positives within the classifications made by a machine learning algorithm that utilizes a threshold probability to classify pathways as sidewalks. In some examples, the disclosed systems may adjust this threshold probability based on a target rate of false positives. For example, a transportation service may determine that it is generally preferable to fail to detect that a user is operating a personal mobility vehicle on a sidewalk than to falsely accuse the user of operating the vehicle on a sidewalk. In other words, false negatives may be more desirable than false positives. Thus, the disclosed systems may increase the threshold probability implemented by a machine learning algorithm in order to limit or control the rate of false positives (e.g., no higher than 5%, 10%, etc.). Additionally or alternatively, the disclosed systems may ensure that the threshold probability produces at least a certain rate (e.g., 90%, 95%, etc.) of true positives. For example, the disclosed systems may select a threshold probability that corresponds to a true positive rate above 97% and a false positive rate below 15%. In further examples, the disclosed systems may select and/or adjust the threshold probability to achieve at least a certain rate of overall accuracy (e.g., the rate of all correct classifications).

Figure 18:
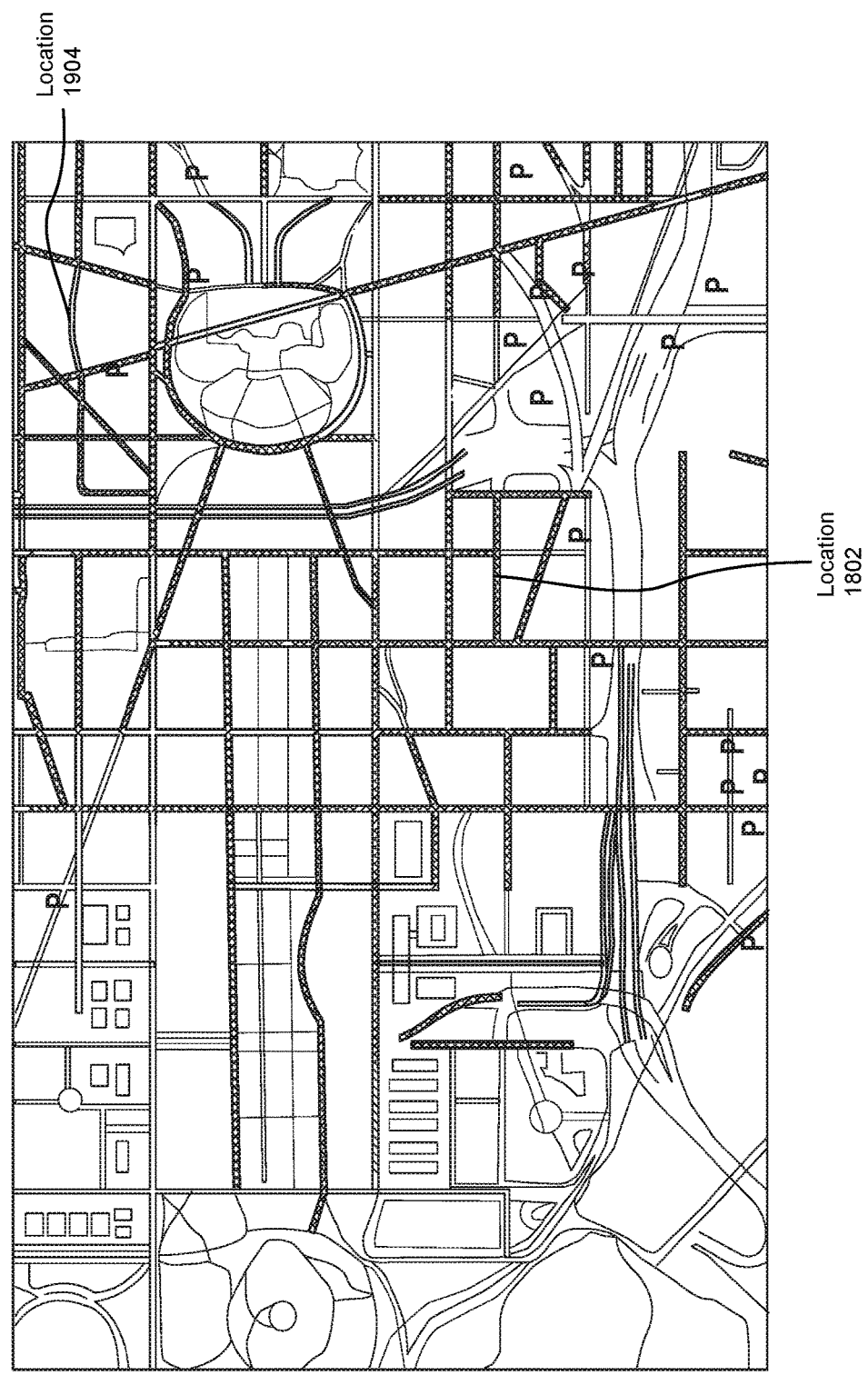
FIG. 18 is an illustration of an example map of sidewalk locations.

Furthermore, the disclosed systems may utilize information about the location of detected sidewalks in a variety of ways. In some examples, the disclosed systems may generate and/or update a map or database that indicates the locations of sidewalks within a city or other geographic region. FIG. 18 illustrates an example of such a map. As shown in FIG. 18, map 1800 may depict roads that are shaded and roads that are not shaded. In this example, roads that are shaded may correspond to roads with adjacent sidewalks and roads that are not shaded may correspond to roads without adjacent sidewalks (or roads with unverified sidewalks). In some embodiments, the disclosed systems may determine that a section of road has a sidewalk (or is likely to have a sidewalk) based at least in part on determining that the rate of sidewalk detections along that section of road exceeds a threshold rate. Additionally or alternatively, the disclosed systems may determine whether a section of road has a sidewalk based on factors such as user input, photographic evidence, and/or knowledge of the type of the road (e.g., a highway is unlikely to have a sidewalk, whereas a road in the downtown area of a city is likely to have a sidewalk).

In some embodiments, the information indicated within map 1800 may be used to more efficiently or successfully route users of personal mobility vehicles. For example, when providing navigation instructions to the user operating vehicle 208, a transportation service provider may reduce the probability that the user operates vehicle 208 on a sidewalk by routing the user along one or more roads that do not have adjacent sidewalks. In another example, the transportation service provider may detect an unusually high rate of personal mobility vehicles driven on sidewalks in a particular location (such as a location 1802 in FIG. 8). This high rate may be due to the road at location 1802 being unsuitable for personal mobility vehicles (e.g., because of high volumes of traffic, construction, poor road conditions, etc.). As such, when providing navigation instructions to the user operating vehicle 208, the transportation service provider may direct the user along a route that avoids location 1802. In a further example, the transportation service may use knowledge of sidewalk locations to confirm or refute a sidewalk detection. For example, after a machine learning algorithm classifies a pathway in a particular location (such as a location 1804 in FIG. 8) as a sidewalk, the transportation service may determine that the pathway is unlikely to be a sidewalk based on knowledge that no sidewalk exists at location 1804.

In some examples, the disclosed systems may use information about the frequency and/or magnitude of vibrations within a personal mobility vehicle to detect when the personal mobility vehicle has collided and/or impacted with another object. For example, the disclosed systems may determine that vehicle 208 has crashed based at least in part on detecting a sudden increase in the magnitude of one or more vibrations within vehicle 208. In some embodiments, the disclosed systems may consider additional factors (such as the speed and/or acceleration of vehicle 208) when determining whether vehicle 208 has crashed or been struck. For example, a significant increase in the magnitude of vibrations within vehicle 208 occurring at the same time vehicle 208 rapidly decelerates and/or stops may strongly indicate and/or correspond to a collision.

In some embodiments, the disclosed systems may train and implement a machine learning algorithm to detect personal mobility vehicle crashes. For example, the disclosed systems may generate one or more models corresponding to the vibrations, speed, and/or acceleration of personal mobility vehicles before, during, and after crashing. The machine learning algorithm may then detect when vehicle 208 has crashed based at least in part on comparing the models with a power spectrum analysis of the vibrations within vehicle 208. This machine learning algorithm may be implemented in a variety of ways, such as by a processing device integrated into vehicle 208 and/or a backend server. In addition, this machine learning algorithm may be implemented concurrently with or separately from the above-described machine learning algorithm for sidewalk-detection.

Furthermore, the disclosed systems may use information about the vibrations, speed, and/or acceleration of a personal mobility vehicle to detect when the vehicle is being stolen or otherwise unexpectedly moved. For example, the disclosed systems may determine that particular types of vibrations correspond to a personal mobility vehicle being carried (and therefore potentially stolen) and other types of vibrations correspond to a personal mobility vehicle being driven. As a specific example, the disclosed systems may identify a particular pattern of vibrations that correspond to a person's footsteps. In another example, the disclosed systems may identify a particular pattern of vibrations that correspond to a personal mobility vehicle being carried up or down a set of stairs. The disclosed systems may therefore determine that vehicle 208 has potentially been stolen based on detecting such vibrations within vehicle 208. As with the crash-detection process described above, the disclosed systems may train and implement a machine learning algorithm to detect when personal mobility vehicles are being stolen.

In some examples, a system may include a non-transitory memory and one or more hardware processors configured to execute instructions from the non-transitory memory. These instructions may perform operations including determining one or more vibration signals detected by a personal mobility vehicle. In some examples, the operations may also include determining that the one or more vibration signals correspond to a particular type of pathway. In some examples, the operations may further include generating and transmitting a feedback signal corresponding to the particular type of pathway.

In some examples, determining the one or more vibration signals may include determining frequencies and/or magnitudes of the one or more vibration signals detected within the personal mobility vehicle.

In some examples, a seam between two sections of a sidewalk introduces at least one particular vibration signal, of the one or more vibration signals detected within the personal mobility vehicle, into the personal mobility vehicle when the personal mobility vehicle moves over the seam. In these examples, the operations may include determining that the one or more vibration signals correspond to the sidewalk based on the magnitude of the particular vibration signal within the personal mobility vehicle exceeding a threshold magnitude.

In some examples, determining that the one or more vibration signals correspond to the sidewalk may further include determining that the particular vibration signal is introduced into the personal mobility vehicle on a periodic basis.

In some examples, the operations may further include using a power spectrum analysis with the one or more vibration signals. The operations may also include isolating the one or more vibration signals that correspond to the particular type of pathway from other vibration signals that correspond to pathways different from the particular type of pathway.

In some examples, the operations may further include isolating the one or more vibration signals that correspond to the particular type of pathway from other vibration signals that correspond to a resonant frequency of the personal mobility vehicle.

In some examples, determining the one or more vibration signals detected by the personal mobility vehicle may include determining a speed of the personal mobility vehicle, an acceleration of the personal mobility vehicle, and/or a deceleration of the personal mobility vehicle.

In some examples, determining that the one or more vibration signals correspond to the particular type of pathway may include providing, to a machine learning algorithm trained to identify various types of pathways, at least a portion of the vibration signals detected by the personal mobility vehicle.

In some examples, determining that the one or more vibration signals correspond to the particular type of pathway may include implementing at least a portion of the machine learning algorithm within hardware integrated into the personal mobility vehicle.

In some examples, determining that the one or more vibration signals correspond to the particular type of pathway may further include extracting, by the portion of the machine learning algorithm, a set of features from the one or more vibration signals detected by the personal mobility vehicle and then sending the set of features to a remote server that implements an additional portion of the machine learning algorithm.

In some examples, determining the one or more vibration signals detected by the personal mobility vehicle may include determining vibration signals detected by the personal mobility vehicle during a plurality of time intervals while the personal mobility vehicle is moving from a starting location to a destination. In these examples, determining that the one or more vibration signals correspond to the particular type of pathway may include detecting, based on a real-time analysis of the one or more vibration signals, that the one or more vibration signals correspond to a sidewalk during at least one of the plurality of time intervals.

In some examples, determining that the one or more vibration signals correspond to the particular type of pathway may include calculating a probability that the one or more vibration signals correspond to a sidewalk and then determining whether the probability exceeds a threshold probability.

In some examples, the operations that further include collecting information about a plurality of classifications of pathways as sidewalks made using the threshold probability, calculating a rate of inaccurate classifications made using the threshold probability, and then increasing the threshold probability based at least in part on determining that the rate of inaccurate classifications exceeds a threshold rate.

In some examples, determining that the one or more vibration signals correspond to the particular type of pathway may include determining that the one or more vibration signals correspond to a sidewalk. In these examples, generating the feedback signal may include generating an audiovisual display that prompts a user operating the personal mobility vehicle to move the personal mobility vehicle to a road that is intended for use by personal mobility vehicles. In these examples, transmitting the feedback signal may include rendering the audiovisual display within a user interface displayed to the user.

In some examples, determining that the one or more vibration signals correspond to the particular type of pathway may include determining that the one or more vibration signals correspond to a sidewalk. In these examples, generating the feedback signal may include generating an instruction that prevents a velocity of the personal mobility vehicle from exceeding a threshold velocity. In these examples, transmitting the feedback signal may include transmitting the instruction to a processing unit that controls the velocity of the personal mobility vehicle.

In some examples, determining that the one or more vibration signals correspond to the particular type of pathway may include determining that the one or more vibration signals correspond to a sidewalk. In these examples, generating the feedback signal may include identifying a geographic location of at least a portion of the sidewalk. In these examples, transmitting the feedback signal may include transmitting the geographic location to a database that provides maps for users operating personal mobility vehicles.

In some examples, determining the one or more vibration signals detected by the personal mobility vehicle may include recording output of an accelerometer integrated into the personal mobility vehicle, a gyroscope integrated into the personal mobility vehicle, an inertial measurement unit integrated into the personal mobility vehicle, and/or a mobile device of a user operating the personal mobility vehicle.

In some examples, the operations may further include collecting a set of training data corresponding to vibration signals detected by personal mobility vehicles while the personal mobility vehicles are operating on sidewalks and then training, based on the set of training data, a machine learning algorithm to detect when the personal mobility vehicle is operating on a sidewalk.

In one example, a non-transitory computer-readable medium may include computer-readable instructions that, when executed by at least one processor of a computing device, cause the computing device to determine one or more vibration signals detected by a personal mobility vehicle. In some examples, the instructions may also cause the computing device to determine that the one or more vibration signals correspond to a particular type of pathway. In some examples, the instructions may further cause the computing device to generate and transmit the feedback signal corresponding to the particular type of pathway.

In one example, a method may include determining one or more vibration signals detected by a personal mobility vehicle. The method may also include determining that the one or more vibration signals correspond to a particular type of pathway for personal mobility vehicle. In some examples, the method may further include generating and transmitting a feedback signal corresponding to the particular type of pathway.

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a server computer system, or any other hardware platform capable of providing transportation matching services to one or more requestors and/or providers.

Figure 19:
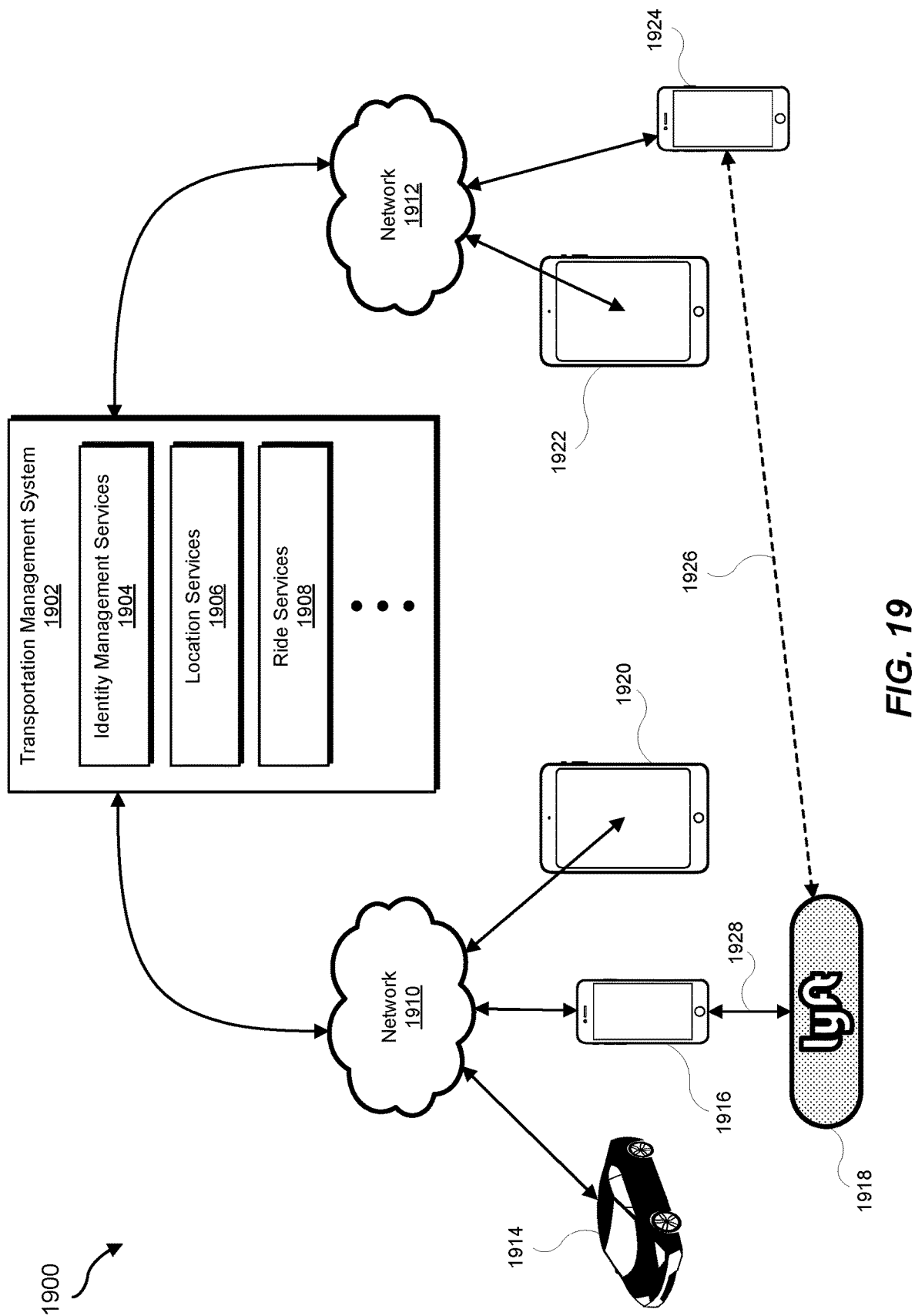
FIG. 19 is an illustration of an example requestor/provider management environment.

FIG. 19 shows a transportation management environment 1900, in accordance with various embodiments. As shown in FIG. 19, a transportation management system 1902 may run one or more services and/or software applications, including identity management services 1904, location services 1906, ride services 1908, and/or other services. Although FIG. 19 shows a certain number of services provided by transportation management system 1902, more or fewer services may be provided in various implementations. In addition, although FIG. 19 shows these services as being provided by transportation management system 1902, all or a portion of any of the services may be processed in a distributed fashion. For example, computations associated with a service task may be performed by a combination of transportation management system 1902 (including any number of servers, databases, etc.), one or more devices associated with a provider (e.g., devices integrated with managed vehicles 1914, provider's computing devices 1916 and tablets 1920, and transportation management vehicle devices 1918), and/or more or more devices associated with a ride requestor (e.g., the requestor's computing devices 1924 and tablets 1922). In some embodiments, transportation management system 1902 may include one or more general purpose computers, server computers, clustered computing systems, cloud-based computing systems, and/or any other computing systems or arrangements of computing systems. Transportation management system 1902 may be configured to run any or all of the services and/or software components described herein. In some embodiments, the transportation management system 1902 may include an appropriate operating system and/or various server applications, such as web servers capable of handling hypertext transport protocol (HTTP) requests, file transfer protocol (FTP) servers, database servers, etc.

In some embodiments, identity management services 1904 may be configured to perform authorization services for requestors and providers and/or manage their interactions and/or data with transportation management system 1902. This may include, e.g., authenticating the identity of providers and determining that they are authorized to provide services through transportation management system 1902. Similarly, requestors' identities may be authenticated to determine whether they are authorized to receive the requested services through transportation management system 1902. Identity management services 1904 may also manage and/or control access to provider and/or requestor data maintained by transportation management system 1902, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1902 may also manage and/or control access to provider and/or requestor data stored with and/or obtained from third-party systems. For example, a requester or provider may grant transportation management system 1902 access to a third-party email, calendar, or task management system (e.g., via the user's credentials). As another example, a requestor or provider may grant, through a mobile device (e.g., 1916, 1920, 1922, or 1924), a transportation application associated with transportation management system 1902 access to data provided by other applications installed on the mobile device. In some examples, such data may be processed on the client and/or uploaded to transportation management system 1902 for processing.

In some embodiments, transportation management system 1902 may provide ride services 1908, which may include ride matching and/or management services to connect a requestor to a provider. For example, after identity management services 1904 has authenticated the identity a ride requestor, ride services 1908 may attempt to match the requestor with one or more ride providers. In some embodiments, ride services 1908 may identify an appropriate provider using location data obtained from location services 1906. Ride services 1908 may use the location data to identify providers who are geographically close to the requestor (e.g., within a certain threshold distance or travel time) and/or who are otherwise a good match with the requestor. Ride services 1908 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1908 may use rule-based algorithms and/or machine-learning models for matching requestors and providers.

Transportation management system 1902 may communicatively connect to various devices through networks 1910 and/or 1912. Networks 1910 and 1912 may include any combination of interconnected networks configured to send and/or receive data communications using various communication protocols and transmission technologies. In some embodiments, networks 1910 and/or 1912 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1910 and/or 1912 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.12 family of standards, Bluetooth, Bluetooth Low Energy, Near Field Communication (NFC), Z-Wave, and ZigBee). In various embodiments, networks 1910 and/or 1912 may include any combination of networks described herein or any other type of network capable of facilitating communication across networks 1910 and/or 1912.

In some embodiments, transportation management vehicle device 1918 may include a provider communication device configured to communicate with users, such as drivers, passengers, pedestrians, and/or other users. In some embodiments, transportation management vehicle device 1918 may communicate directly with transportation management system 1902 or through another provider computing device, such as provider computing device 1916. In some embodiments, a requestor computing device (e.g., device 1924) may communicate via a connection 1926 directly with transportation management vehicle device 1918 via a communication channel and/or connection, such as a peer-to-peer connection, Bluetooth connection, NFC connection, ad hoc wireless network, and/or any other communication channel or connection. Although FIG. 19 shows particular devices communicating with transportation management system 1902 over networks 1910 and 1912, in various embodiments, transportation management system 1902 may expose an interface, such as an application programming interface (API) or service provider interface (SPI) to enable various third parties which may serve as an intermediary between end users and transportation management system 1902.

In some embodiments, devices within a vehicle may be interconnected. For example, any combination of the following may be communicatively connected: vehicle 1914, provider computing device 1916, provider tablet 1920, transportation management vehicle device 1918, requestor computing device 1924, requestor tablet 1922, and any other device (e.g., smart watch, smart tags, etc.). For example, transportation management vehicle device 1918 may be communicatively connected to provider computing device 1916 and/or requestor computing device 1924. Transportation management vehicle device 1918 may establish communicative connections, such as connections 1926 and 1928, to those devices via any suitable communication technology, including, e.g., WLAN technologies implementing the IEEE 802.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1902 using applications executing on their respective computing devices (e.g., 1916, 1918, 1920, and/or a computing device integrated within vehicle 1914), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1914 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1902. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 20:
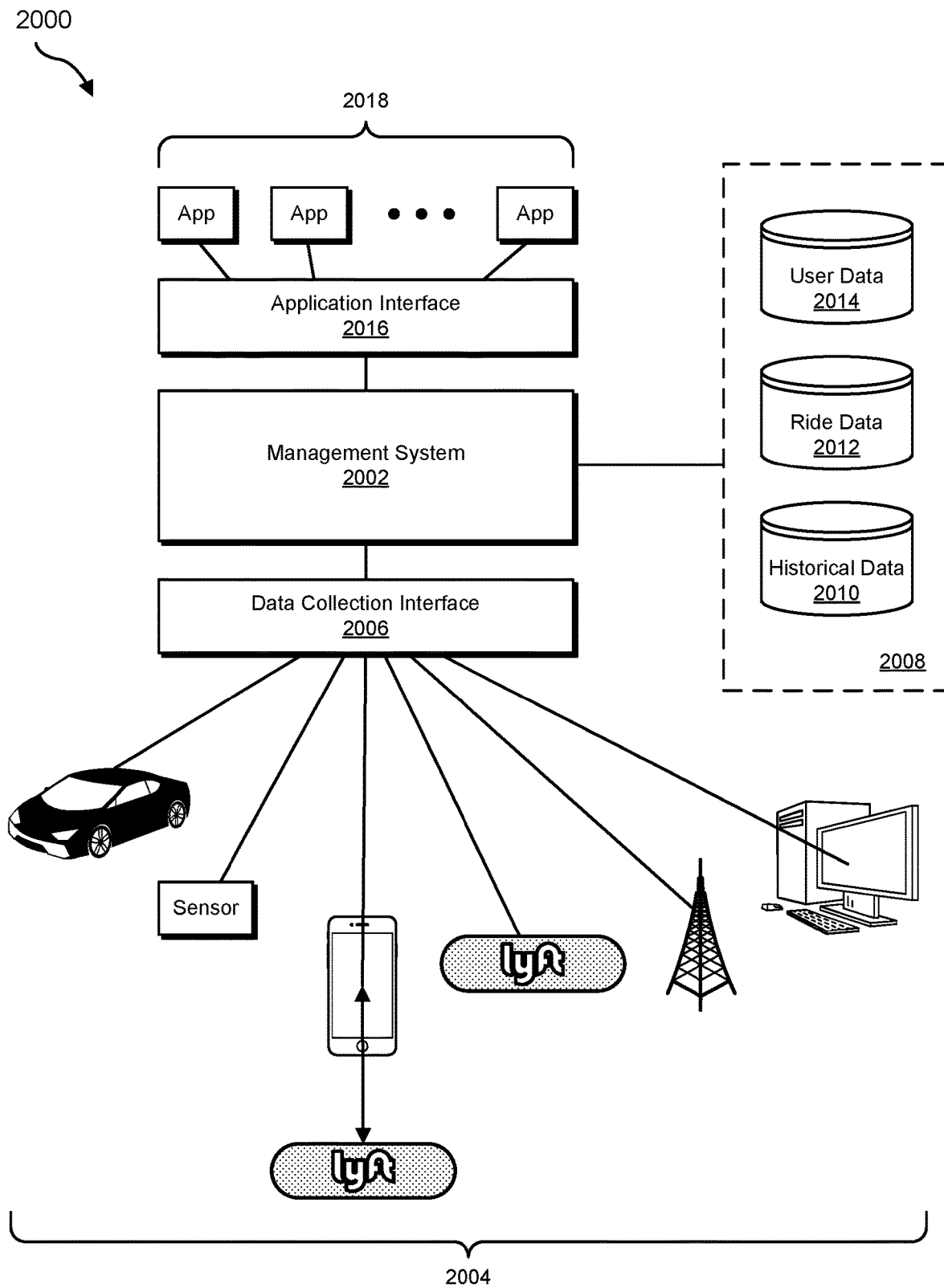
FIG. 20 is an illustration of an example data collection and application management system.

FIG. 20 shows a data collection and application management environment 2000, in accordance with various embodiments. As shown in FIG. 20, management system 2002 may be configured to collect data from various data collection devices 2004 through a data collection interface 2006. As discussed above, management system 2002 may include one or more computers and/or servers or any combination thereof. Data collection devices 2004 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 2006 can include, e.g., an extensible device framework configured to support interfaces for each data collection device. In various embodiments, data collection interface 2006 may be extended to support new data collection devices as they are released and/or to update existing interfaces to support changes to existing data collection devices. In various embodiments, data collection devices may communicate with data collection interface 2006 over one or more networks. The networks may include any network or communication protocol as would be recognized by one of ordinary skill in the art, including those networks discussed above.

As shown in FIG. 20, data received from data collection devices 2004 can be stored in data store 2008. Data store 2008 may include one or more data stores, such as databases, object storage systems and services, cloud-based storage services, and other data stores. For example, various data stores may be implemented on a non-transitory storage medium accessible to management system 2002, such as historical data store 2010, ride data store 2012, and user data store 2014. Data store 2008 can be local to management system 2002, or remote and accessible over a network, such as those networks discussed above or a storage-area network or other networked storage system. In various embodiments, historical data 2010 may include historical traffic data, weather data, request data, road condition data, or any other data for a given region or regions received from various data collection devices. Ride data 2012 may include route data, request data, timing data, and other ride related data, in aggregate and/or by requestor or provider. User data 2014 may include user account data, preferences, location history, and other user-specific data. Although certain data stores are shown by way of example, any data collected and/or stored according to the various embodiments described herein may be stored in data store 2008.

As shown in FIG. 20, an application interface 2016 can be provided by management system 2002 to enable various apps 2018 to access data and/or services available through management system 2002. Apps 2018 may run on various user devices (including provider and requestor computing devices, such as those discussed above) and/or may include cloud-based or other distributed apps configured to run across various devices (e.g., computers, servers, or combinations thereof). Apps 2018 may include, e.g., aggregation and/or reporting apps which may utilize data store 2008 to provide various services (e.g., third-party ride request and management apps). In various embodiments, application interface 2016 can include an API and/or SPI enabling third party development of apps 2018. In some embodiments, application interface 2016 may include a web interface, enabling web-based access to data store 2008 and/or services provided by management system 2002. In various embodiments, apps 2018 may run on devices configured to communicate with application interface 2016 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a non-transitory memory comprising computer-readable instructions; and
one or more hardware processors configured to execute the instructions from the non-transitory memory to perform operations comprising:
determining one or more vibration signals detected by a personal mobility vehicle;
determining that the one or more vibration signals correspond to a particular type of pathway for the personal mobility vehicle, wherein the determining comprises:
calculating, based on the one or more vibration signals and a weight or position of a user operating the personal mobility vehicle, a probability that the one or more vibration signals correspond to a sidewalk; and
determining whether the probability exceeds a threshold probability;
generating a feedback signal corresponding to the particular type of pathway; and
transmitting the feedback signal corresponding to the particular type of pathway.

2. The system of claim 1, wherein determining the one or more vibration signals comprises determining:
frequencies of the one or more vibration signals detected by the personal mobility vehicle; and
magnitudes of the one or more vibration signals detected by the personal mobility vehicle.

3. The system of claim 2, wherein:
a seam between two sections of the sidewalk introduces at least one particular vibration signal, of the one or more vibration signals detected by the personal mobility vehicle, into the personal mobility vehicle when the personal mobility vehicle moves over the seam; and
determining that the one or more vibration signals correspond to the sidewalk based on a magnitude of the particular vibration signal within the personal mobility vehicle exceeding a threshold magnitude.

4. The system of claim 3, wherein determining that the one or more vibration signals correspond to the sidewalk further comprises determining that the particular vibration signal is introduced into the personal mobility vehicle on a periodic basis.

5. The system of claim 1, wherein the operations further comprise:
using a power spectrum analysis with the one or more vibration signals; and
isolating the one or more vibration signals that correspond to the particular type of pathway from other vibration signals that correspond to pathways different from the particular type of pathway.

6. The system of claim 1, wherein the operations further comprise isolating the one or more vibrations signals that correspond to the particular type of pathway from other vibration signals that correspond to a resonant frequency of the personal mobility vehicle.

7. The system of claim 1, wherein determining that the one or more vibration signals correspond to the particular type of pathway further comprises providing, to a machine learning algorithm trained to identify various types of pathways, at least a portion of the vibration signals detected by the personal mobility vehicle and the weight or position of the user.

8. The system of claim 7, wherein determining that the one or more vibration signals correspond to the particular type of pathway further comprises implementing at least a portion of the machine learning algorithm within hardware integrated into the personal mobility vehicle.

9. The system of claim 8, wherein determining that the one or more vibration signals correspond to the particular type of pathway further comprises:
extracting, by the portion of the machine learning algorithm, a set of features from the one or more vibration signals detected by the personal mobility vehicle and the weight or position of the user; and
sending the set of features to a remote server that implements an additional portion of the machine learning algorithm.

10. The system of claim 1, wherein:
determining the one or more vibration signals detected by the personal mobility vehicle comprises determining vibration signals detected by the personal mobility vehicle during a plurality of time intervals while the personal mobility vehicle is moving from a starting location to a destination; and
determining that the one or more vibration signals correspond to the particular type of pathway further comprises detecting, based on a real-time analysis of the one or more vibration signals, that the one or more vibration signals correspond to the sidewalk during at least one of the plurality of time intervals.

11. The system of claim 1, wherein the one or more hardware processors are further configured to execute the instructions from the non-transitory memory to perform operations comprising:
collecting information corresponding to a plurality of classifications of pathways as sidewalks made using the threshold probability;
calculating a rate of inaccurate classifications made using the threshold probability; and
increasing the threshold probability based at least in part on determining that the rate of inaccurate classifications exceeds a threshold rate.

12. The system of claim 1, wherein:
determining that the one or more vibration signals correspond to the particular type of pathway further comprises determining that the one or more vibration signals correspond to the sidewalk;
generating the feedback signal comprises generating an audiovisual display that prompts a user operating the personal mobility vehicle to move the personal mobility vehicle to a road that is intended for use by personal mobility vehicles; and
transmitting the feedback signal comprises rendering the audiovisual display within a user interface displayed to the user.

13. The system of claim 1, wherein:
determining that the one or more vibration signals correspond to the particular type of pathway further comprises determining that the one or more vibration signals correspond to the sidewalk;

generating the feedback signal comprises generating an instruction that prevents a velocity of the personal mobility vehicle from exceeding a threshold velocity; and transmitting the feedback signal comprises transmitting the instruction to a processing unit that controls the velocity of the personal mobility vehicle.

14. The system of claim 1, wherein:

determining that the one or more vibration signals correspond to the particular type of pathway further comprises determining that the one or more vibration signals correspond to the sidewalk;

generating the feedback signal comprises identifying a geographic location of at least a portion of the sidewalk; and transmitting the feedback signal comprises transmitting the geographic location to a database that provides maps for users operating personal mobility vehicles.

15. A non-transitory computer-readable medium comprising computer-readable instructions that, when executed by at least one processor of a computing device, cause the computing device to:

determine one or more vibration signals detected by a personal mobility vehicle;

determine that the one or more vibration signals correspond to a particular type of pathway for the personal mobility vehicle, wherein the determining comprises:

calculating, based on the one or more vibration signals and a weight or position of a user operating the personal mobility vehicle, a probability that the one or more vibration signals correspond to a sidewalk; and determining whether the probability exceeds a threshold probability;

generate a feedback signal corresponding to the particular type of pathway; and transmit the feedback signal corresponding to the particular type of pathway.

16. A method comprising:

determining one or more vibration signals detected by a personal mobility vehicle;

determining that the one or more vibration signals correspond to a particular type of pathway for the personal mobility vehicle, wherein the determining comprises:

calculating, based on the one or more vibration signals and a weight or position of a user operating the personal mobility vehicle, a probability that the one or more vibration signals correspond to a sidewalk; and determining whether the probability exceeds a threshold probability;

generating a feedback signal corresponding to the particular type of pathway; and transmitting the feedback signal corresponding to the particular type of pathway.

17. The medium of claim 15, further comprising computer-readable instructions that, when executed by the at least one processor of the computing device, cause the computing device to:

isolate the one or more vibrations signals that correspond to the particular type of pathway from other vibration signals that correspond to a resonant frequency of the personal mobility vehicle.

18. The medium of claim 15, wherein determining that the one or more vibration signals correspond to the particular type of pathway further comprises providing, to a machine learning algorithm trained to identify various types of pathways, at least a portion of the vibration signals detected by the personal mobility vehicle and the weight or position of the user.

19. The method of claim 16, further comprising:

isolating the one or more vibrations signals that correspond to the particular type of pathway from other vibration signals that correspond to a resonant frequency of the personal mobility vehicle.

20. The method of claim 16, wherein determining that the one or more vibration signals correspond to the particular type of pathway further comprises providing, to a machine learning algorithm trained to identify various types of pathways, at least a portion of the vibration signals detected by the personal mobility vehicle and the weight or position of the user.

* * * * *